(12) United States Patent
Griffin et al.

(10) Patent No.: US 8,769,772 B2
(45) Date of Patent: Jul. 8, 2014

(54) MOBILE ELECTRONIC DEVICE HAVING MEMBER ROTATABLE BETWEEN FIRST AND SECOND POSITIONS

(75) Inventors: Jason Tyler Griffin, Kitchener (CA); Martin Riddiford, London (GB); James William Reeves, Twyford (GB)

(73) Assignee: BlackBerry Limited, Waterloo (CA)

( * ) Notice: Subject to any disclaimer, the term of this patent is extended or adjusted under 35 U.S.C. 154(b) by 268 days.

(21) Appl. No.: 13/206,870

(22) Filed: Aug. 10, 2011

(65) Prior Publication Data

US 2013/0036846 A1 Feb. 14, 2013

(51) Int. Cl.
*E05D 7/00* (2006.01)
(52) U.S. Cl.
USPC .................................. 16/354; 16/368; 16/369
(58) Field of Classification Search
USPC ............................................ 16/354, 368, 369
See application file for complete search history.

(56) References Cited

U.S. PATENT DOCUMENTS

| | | | |
|---|---|---|---|
| 5,103,376 A | 4/1992 | Blonder |
| 5,255,214 A | 10/1993 | Ma |
| 5,268,817 A | 12/1993 | Miyagawa et al. |
| 5,276,589 A | 1/1994 | Bartlett et al. |
| 5,410,447 A | 4/1995 | Miyagawa et al. |
| 5,548,478 A | 8/1996 | Kumar et al. |
| 5,644,469 A | 7/1997 | Shioya et al. |
| 5,706,167 A | 1/1998 | Lee |
| 5,900,848 A | 5/1999 | Haneda et al. |
| D416,003 S | 11/1999 | Schiefer et al. |
| 6,005,767 A | 12/1999 | Ku et al. |
| 6,266,236 B1 | 7/2001 | Ku et al. |
| 6,434,371 B1 | 8/2002 | Claxton |
| 6,532,147 B1 | 3/2003 | Christ |
| 6,556,435 B1 | 4/2003 | Helot et al. |
| 6,700,773 B1 | 3/2004 | Adriaansen et al. |
| 6,827,409 B2 | 12/2004 | Michael |
| 6,903,927 B2 | 6/2005 | Anlauff |
| 7,079,872 B2 | 7/2006 | Khalid et al. |
| 7,140,074 B2 | 11/2006 | Han et al. |

(Continued)

FOREIGN PATENT DOCUMENTS

| | | |
|---|---|---|
| EP | 1670218 A1 | 6/2006 |
| EP | 1699208 A1 | 9/2006 |

(Continued)

OTHER PUBLICATIONS

Printout of photograph of Lenovo ThinkPad X61 tablet PC as retrieved from <http://crunchgear.com/wp-content/uploads/lenovo-thinkpad-x61-tablet- . . . > (dated May 18, 2007).

(Continued)

*Primary Examiner* — Roberta Delisle
(74) *Attorney, Agent, or Firm* — Novak Druce Connolly Bove + Quigg LLP

(57) ABSTRACT

According to some embodiments, a mobile electronic device is provided with a linkage mechanism that couples first and second members of the device such that the device may be moved between a first position and a second position. The linkage mechanism includes a linkage intermediate the first and second members, the linkage having a fixed length. The linkage mechanism further includes a motion constraint mechanism that constrains movement of the first member with respect to the second member to a controlled motion. The linkage mechanism described herein may further provide that the top member rotates without increasing the length or width of the device.

25 Claims, 25 Drawing Sheets

(56) References Cited

U.S. PATENT DOCUMENTS

| | | | |
|---|---|---|---|
| 7,197,346 B2 | 3/2007 | Eromaki et al. | |
| 7,203,058 B2 * | 4/2007 | Hong | 361/679.06 |
| 7,221,562 B2 | 5/2007 | Song | |
| 7,277,275 B2 | 10/2007 | Won et al. | |
| 7,283,355 B2 * | 10/2007 | Han | 361/679.55 |
| 7,414,834 B2 | 8/2008 | Ukonaho et al. | |
| 7,418,275 B2 | 8/2008 | Yiu | |
| 7,512,426 B2 | 3/2009 | Maatta et al. | |
| 7,567,830 B2 | 7/2009 | Hur | |
| 7,599,181 B2 | 10/2009 | Chuang et al. | |
| 7,633,745 B2 | 12/2009 | Sakakibara et al. | |
| 7,725,988 B2 * | 6/2010 | Kim et al. | 16/361 |
| 7,844,915 B2 | 11/2010 | Platzer et al. | |
| 8,074,323 B2 | 12/2011 | Lin | |
| 8,086,290 B2 | 12/2011 | Yoon et al. | |
| 8,108,017 B2 | 1/2012 | Jang et al. | |
| 8,152,147 B2 | 4/2012 | Yang | |
| 8,186,781 B2 * | 5/2012 | Coleman et al. | 312/405 |
| 8,190,219 B2 | 5/2012 | Park et al. | |
| 8,205,305 B2 * | 6/2012 | Wang et al. | 16/354 |
| 8,265,719 B2 | 9/2012 | Lindvall | |
| 8,286,307 B2 | 10/2012 | Cheng et al. | |
| 8,290,549 B2 * | 10/2012 | Reeves et al. | 455/575.3 |
| 2002/0038493 A1 | 4/2002 | Ko et al. | |
| 2002/0126441 A1 | 9/2002 | Kuo et al. | |
| 2003/0197745 A1 | 10/2003 | Daly | |
| 2005/0002158 A1 | 1/2005 | Olodort et al. | |
| 2005/0083644 A1 | 4/2005 | Song | |
| 2005/0099533 A1 | 5/2005 | Matsuda et al. | |
| 2005/0200608 A1 | 9/2005 | Ulla et al. | |
| 2006/0012563 A1 | 1/2006 | Fyke et al. | |
| 2006/0038795 A1 | 2/2006 | Lee | |
| 2006/0071916 A1 | 4/2006 | Jeun et al. | |
| 2006/0148543 A1 | 7/2006 | Hunt | |
| 2006/0252471 A1 | 11/2006 | Pan | |
| 2007/0086155 A1 | 4/2007 | Chen et al. | |
| 2007/0183123 A1 * | 8/2007 | Chuan et al. | 361/679 |
| 2008/0000048 A1 | 1/2008 | Petrella | |
| 2008/0044007 A1 | 2/2008 | Fujii | |
| 2008/0068786 A1 | 3/2008 | Cheng et al. | |
| 2008/0161075 A1 | 7/2008 | Kim et al. | |
| 2008/0287167 A1 | 11/2008 | Caine | |
| 2009/0048006 A1 | 2/2009 | Liao et al. | |
| 2009/0061956 A1 | 3/2009 | Matsuoka | |
| 2009/0061959 A1 | 3/2009 | Cheng et al. | |
| 2009/0147458 A1 | 6/2009 | Wang et al. | |
| 2009/0227301 A1 | 9/2009 | Lindvall | |
| 2010/0113100 A1 | 5/2010 | Harmon et al. | |
| 2010/0151924 A1 | 6/2010 | Amano | |
| 2010/0232102 A1 | 9/2010 | Walker et al. | |
| 2010/0296232 A1 | 11/2010 | Yeh et al. | |
| 2010/0299873 A1 | 12/2010 | Song | |
| 2011/0038108 A1 | 2/2011 | Chang et al. | |
| 2011/0122553 A1 | 5/2011 | Griffin et al. | |
| 2011/0221319 A1 | 9/2011 | Law et al. | |
| 2011/0312392 A1 | 12/2011 | Reeves et al. | |

FOREIGN PATENT DOCUMENTS

| | | |
|---|---|---|
| EP | 1760998 A2 | 3/2007 |
| EP | 1835703 A1 | 9/2007 |
| EP | 1838072 A2 | 9/2007 |
| EP | 2031839 A1 | 3/2009 |
| EP | 2346231 A1 | 7/2011 |
| JP | 2004235687 | 8/2004 |
| KR | 20060076338 | 7/2006 |
| WO | 2008056019 | 5/2008 |
| WO | 2009038375 A2 | 3/2009 |
| WO | 2009099275 A2 | 8/2009 |

OTHER PUBLICATIONS

Printout of article titled "Inspiron Duo convertible tablet dated, detailed and priced" as retrieved from <http://techreport.com/discussions.x/20012> (dated Nov. 18, 2010).
Printout of photograph of Dell Duo tablet as retrieved from <http://netbookreview.co.uk/wp-content/uploads/2010/11/dell-duo.jpg> (retrieved Dec. 3, 2010).
Printout of <http://www.itproportal.com/media-site/photos/dell_inspiron_duo.png> (retrieved Dec. 16, 2010).
Printout of <http://pencomputing.com/images/TPCEvosequence.jpg> (retrieved Dec. 9, 2010).
Printout of <http://www.ubergizmo.com/photos/2007/1/oqo_468.jpg> (retrieved Dec. 16, 2010).
Printout of article titled "Samsung Gloria to be a 10-inch Windows 7 tablet with slide-out keyboard?" as retrieved from <http://www.engadget.com/2010/12/08/samsung-gloria-to-be-a-10-inch-windows-7-tablet-with-slide-out-k/> (dated Dec. 8, 2010).
Printout of article titled "Samsung Glora tablet to come with slide-out keyboard?" as retrieved from <http://www.ubergizmo.com/15/archives/2010/12/samsung_glora_1_tablet_to_come_with-slide-out-keyboard/> (dated Dec. 8, 2010).
Printout of article titled "Slide Out that keyboard on your iPhone 4" retrieved from <http://www.yourtechreport.com/2010/11/18/slide-out-that-keyboard-on-your-iphone-4/> (dated Nov. 18, 2010).
Printout of article titled "Boxwave's Keyboard Buddy case gives your iPhone 4 physical keys" as retrieved from <http://9to5mac.com/36290/boxwaves-keyboard-buddy-cases-gives-your-iphone-4-physical-keys/> (dated Nov. 17, 2010).
Printout of photographs of Phone with Full Slide-Out Keyboard as retrieved from <http://tradestead.com/images-phone-full-slide-out-keyboard-3-2-intuitive-touch-screen-wifi-recommend_p10990_n2.html> (retrieved Dec. 16, 2010).
Printout of article titled "Intel's UrbanMax concept device demonstrated on video" as retrieved from <http://www.engadget.com/2008/08/20/intels-urbanmax-concept-device-demonstrated-on-video/> (dated Aug. 20, 2008).
Printout of article titled "Intel's UrbanMax slider laptop concept unveiled at IDF" as retrieved from <http:www.endgadget.com/2008/08/19/intels-urbanmax-slider-laptop-concept-unveiled-at-idf> (dated Aug. 19, 2008).
Printout of article titled "Eking introduces a Portable tablet with a slide-out keyboard" as retrieved from <http://liliputing.com/2010/07/eking-introduces-a-portable-tablet-with-a-slide-out-keyboard.html> (posted Jul. 22, 2010).
Printout of article titled "Eking E5 UMPC brings tilting, sliding 5-inch display" as retrieved from <http://techfused.com/eking-e5-umpc-brings-tilting-sliding-5-inch-display> (dated Aug. 21, 2010).
Printout of article titled "Eking's latest Portable Tablet with a Slide-Out Keyboard" as retrieved from <http://www.laptopinyo.com/2010/07/ekings-latest-portable-tablet-with-a-slide-out-keyboard/> (dated Jul. 23, 2010).
Printout of article titled "Eking M5 side slide MID arrives" as retrieved from <http://www.clonedinchina.com/2010/08/eking-m5-side-slide-mid-arrives.html> (dated Aug. 21, 2010).
Printout of photograph of Eking S515 Slider UMPC retrieved from <http://www.flickr.com/photos/umpcportal/4162816984/in/photostream/> (photo taken Dec. 6, 2009).
Printout of photograph and related description of vCoach folding desk stand as retrieved from <http://www.vcoach.net/VC/general/products/accessories.asp> (retrieved Dec. 9, 2010).
Printout of photograph and related description of Rocketfish Adjustable Notebook Stand as retrieved from <http://www.thisnext.com/item/AD19BBDB/EDCAD0F5/Rocketfish-Adjustable-Notebook> (retrieved Dec. 9, 2010).
Printout of <http://www.assistiveit.co.uk/images/laptop%20stand.jpg> (retrieved Dec. 9, 2010).
Printout of photograph and related description of Portabook laptop stand as retrieved from <http://laptoppimp.com/laptop-accessories/the-portabook-laptop-stand/> (retrieved Dec. 9, 2010).
Printout of <http://laptoping.com/wp-content/acer_travelmate_c210_1.gif> (retrieved Dec. 16, 2010).
Printout of <http://pdab.net/img/clio_c1050.jpg> (retrieved Dec. 3, 2010).
Printout of <http://www.smartphonemag.com/_archives/Jan00/images/Vadem_Clio_group.jpg> (retrieved Dec. 3, 2010).
Printout of <http://thetabletpc.net/Photos-WinHEC/PICT0564.JPG (retrieved Dec. 16, 2010).

(56) References Cited

OTHER PUBLICATIONS

Printout of a picture of iPad Keyboard Dock retrieved from <http://reviews.cnet.com/keyboards/apple-ipad-keyboard-dock/4505-3134_7-34058880.html?tag=content;get-selector#reviewPage1>, posted on Apr. 20, 2010.
Printout of <http://www.tabletpc2.com/Review-HPTC1100.htm>, posted in Mar. 2004.
Printout of photograph and description of Kohjinsha SX series as retrieved from <http://www.engadget.com/2008/06/23/kohjinsha-sx-series-convertible-tablet-edges-out-of-umpc-territo/> on Sep. 9, 2009.
Printout of <http://www.lcwprops.com/upload/catalog/lcw_4718.jpg> accessed at least on Sep. 1, 2009.
Printout of a photograph of Electronic Rolodex w/Auto Dialfirst retrieved from <http://www.j-syscomputers.com/invtypageALL.htm> on Sep. 1, 2009.
Printout of <http://www.mobileburn.com/review.jsp?Id=2917>, first accessed at least on May 12, 2009.
Printout of a photographs of Flip Mobile Phone SIBA E381+ with Rotate 180 degrees camera (dual sim phone) retrieved from <http://www.alibaba.com/seo/buySeoLead.htm?SearchText=Flip%20mobile%20phone%20SIBA%20E381+%20with%20Rotate%20180%20degrees%20camera%20&IndexArea=product_en>, accessed on May 12, 2009.
Printout of <http://www.ecplaza.net/tradeleads/sellers/4335838/friction_stay_hinge.html>, accessed at least on May 26, 2009.
Picture and description of MPH Cell Phone Hinge taken from www.sugatsune.net/Industrial_Hardware_Components/Products/productdetails.cfm?CATID=7&SUBCATID=4&PRODUCTID=MPH>, accessed at least on May 26, 2009.
Picture and description of HG-JHW Soft-Close Dampering Hinge taken from <www.sugatsune.net/Industrial_Hardware_Components/Products/productdetails.cfm?CATID=7&SUBCATID=4&PRODUCTID=HG-JHW>, accessed at least on May 26, 2009.
Picture and description of HG-JH210 Lift Assist Hinge taken from <www.sugatsune.net/Industrial_Hardware_Components/Products/productdetails.cfm?CATID=7&SUBCATID=4&PRODUCTID=MPH>, accessed at least on May 26, 2009.
Print out of an English machine translation of JP 2004235687 obtained from <http://www4.ipdl.inpit.go.jp/Tokujitu/tjsogodben.ipdl?N0000=115>.
English translation of Patent Abstract of Japan, Publication No. 2004235687.
Extended European Search Report in respect of European Patent Application No. 09180013.6 dated Jun. 14, 2010.
Extended European Search Report in respect of European Patent Application No. 10166228.6 dated Dec. 23, 2010.
Extended European Search Report in respect of European Patent Application No. 10150910.7 dated Sep. 9, 2010.
Partial European Search Report in respect of European Patent Application No. 10150910.7 Jun. 1, 2010.
Extended European Search Report in respect of European Patent Application No. 11162190.0 dated May 6, 2011.
Extended European Search Report in respect of European Patent Application No. 11162200.7 on Jul. 7, 2011.
Non-Final Office Action in respect of U.S. Appl. No. 12/816,552 dated Dec. 9, 2011.
Non-Final Office Action in respect of U.S. Appl. No. 12/687,947 dated Dec. 14, 2011.
Extended European Search Report in respect of European Patent Application No. 11177125.9 dated Jan. 26, 2012.
Partial Search Report in respect of European Patent Application No. 11177125.9 dated Nov. 15, 2011.
Extended European Search Report in respect of European Patent Application No. 11177100.2 dated Jan. 3, 2012.
U.S. Non-Final Office Action dated Jul. 18, 2013 that issued for U.S. Appl. No. 13/207,029.
Office Action mailed Sep. 9, 2013, in U.S. Appl. No. 12/687,947.
Final Office Action mailed Dec. 24, 2013; in corresponding U.S. Appl. No. 13/207,029.

* cited by examiner

MOBILE ELECTRONIC DEVICE HAVING MEMBER ROTATABLE BETWEEN FIRST AND SECOND POSITIONS

FIELD OF THE DISCLOSURE

The application relates to mobile electronic devices, and more particularly to mobile electronic devices having first and second body members which may be arranged in opened and closed positions.

BACKGROUND

A mobile electronic device may include a surface having one or more interface elements such as a touchscreen, another type of graphical display, a keyboard, etc. A touchscreen or other graphical display may be large and substantially cover the surface of the device. Mobile devices having large interface elements, such as a large touchscreen or graphical display, may typically be limited in their ability to protect those large elements. For example, a conventional mobile device with a large touchscreen and/or graphical display may include a single main body member which houses the interface elements of the device. The touchscreen and/or graphical display may be constantly exposed. Therefore, interface elements, such as a touchscreen or display, may become scratched, dirty, or otherwise degraded when not in use. Such conventional devices include "tablet" computing devices and other conventional portable computing and/or communication products.

In recent years, as consumer electronics products have evolved towards using ever larger screens, consumers have become increasingly concerned that these screens will get scratched or damaged. This often results in the consumer purchasing and fitting protective sleeves, films or covers that add bulk, detract from aesthetics, and can be difficult to fit and sometimes even compromise functionality. A conventional cover may include a front cover that opens similarly to the cover of a book to expose the surface of the device having interface elements. Thus, opening and closing the device may, at least temporarily, increase the overall width of the device rendering the conventional type of cover inconvenient to use when the device is being used during situations where personal space is limited, such as on buses or airplanes. Furthermore, a conventional cover may be loose and/or uncontrolled when the device is opened. The user may also encounter the ergonomic problem of what to do with this redundant cover element or 'flap', thus making the process of opening and closing the device cumbersome.

BRIEF DESCRIPTION OF THE DRAWINGS

Some embodiments of the disclosure will now be described in greater detail with reference to the accompanying diagrams, in which.

DETAILED DESCRIPTION

Figure 1:
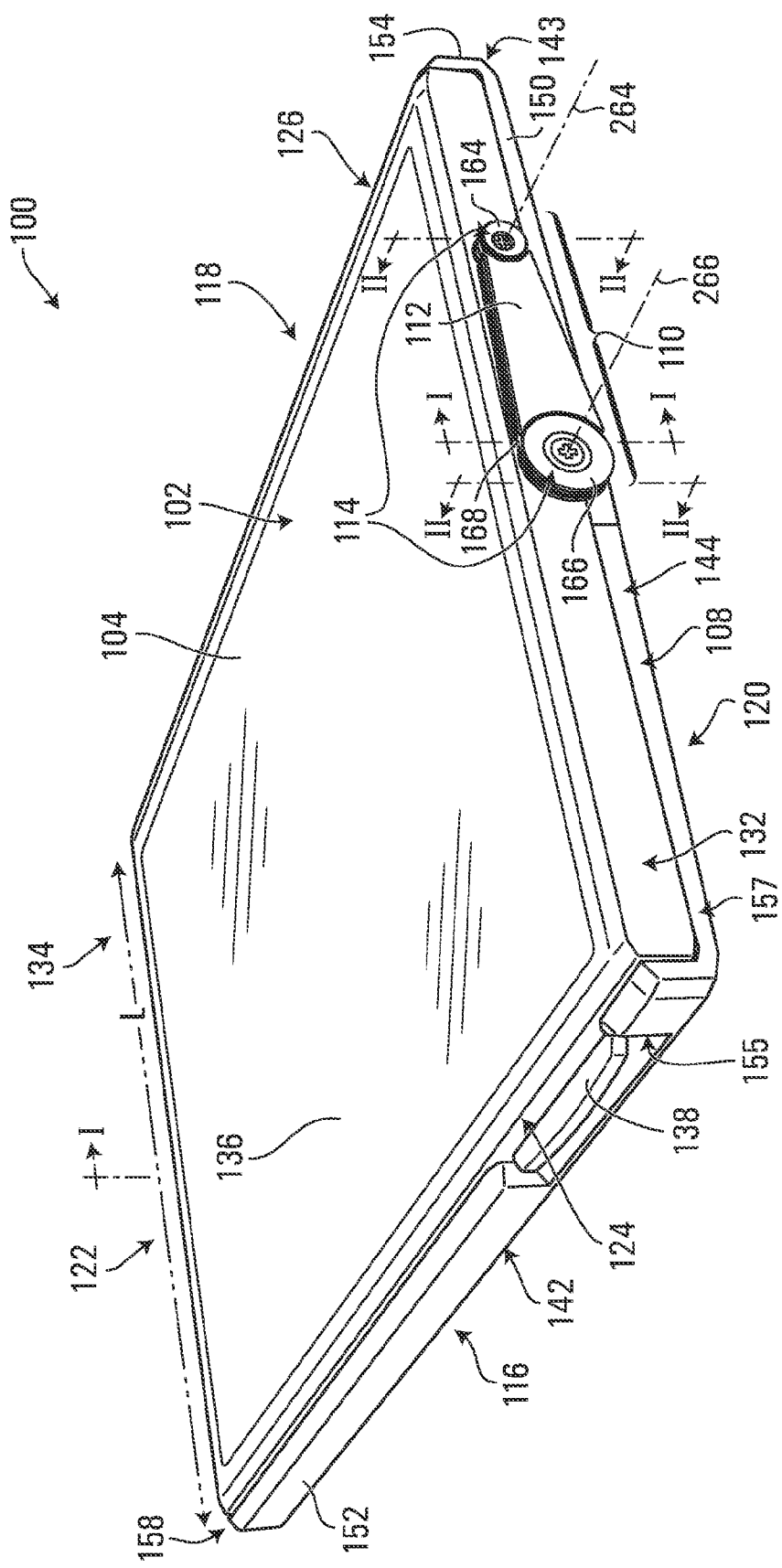
FIG. 1 is a top perspective view of a mobile electronic device according to one embodiment in an opened position.

According to one aspect of the disclosure, there is provided a mobile electronic device comprising: a first member having a first surface and a second surface opposite to the first surface; a second member; and at least one linkage mechanism coupling the first member and the second member such that the device may be moved between a first position and a second position, the at least one linkage mechanism comprising: a linkage intermediate the first member and the second member; and a motion constraint mechanism that constrains movement of the first member with respect to the second member between the first and second positions to a predefined rotational and translational path, the rotational and translational path being defined by rotation of the first member with respect to the second member and counter-rotation of the linkage with respect to the second member, wherein when the device is in the first position, the first member overlies the second member, the first surface is accessible and faces away from the second member, and the second surface faces toward the second member, and when the device is in the second position, the first member overlies the second member, the second surface is accessible and faces away from the second member, and the first surface faces toward the second member.

In some embodiments, the motion control mechanism is a pulley system intermediate the first member and the second member.

In some embodiments, the motion constraint mechanism transfers the rotation of the first member to the counter-rotation of the linkage and transfers the counter-rotation of the linkage to the rotation of the first member, thereby coupling the rotation of the first member with the counter-rotation of the linkage.

In some embodiments, the motion constraint mechanism comprises: a first node fixedly attached to a side of the first member, the linkage being rotatably coupled to the first member at the first node; a second node fixedly attached to a side of the second member, the linkage being rotatably coupled to the second member at the second node, the linkage having a fixed length; and a rotation transfer mechanism that rotationally couples the first node and the second node to thereby transfer the rotation of the first member to the counter-rotation of the linkage and transfer the counter-rotation of the linkage to the rotation of the first member.

In some embodiments, the first member has a first end and a second end, and the first member has a length (L) between the first end and the second end, and the first node is located less than one quarter of the length (L) away from the second end of the first member, the first end of the first member initially rotating away from the second member during the movement between the first position and the second position.

In some embodiments, the second member has a first end and a second end, and the second node is located centrally between the first end and the second end of the second member.

In some embodiments: the first member has a first axis of rotation, and the first node has a first perimeter about the first axis of rotation; the linkage has a second axis of rotation, and the second node has a second perimeter about the second axis of rotation; and the rotation transfer mechanism comprises a flexible link that is wrapped around at least a portion of each of the first and second perimeters, and which is anchored to each of the first node and the second node.

In some embodiments, the motion constraint mechanism comprises a pulley system, the first node comprising a first pulley of the pulley system, the second node comprising a second pulley of the pulley system, and the flexible link comprising at least one line of the pulley system, the at least one line coupling the first pulley and the second pulley.

In some embodiments, a diameter of the second pulley and a diameter of the first pulley are in accordance with the formula:

$$D2 = \left(\frac{(2*\alpha) + 180}{2*\alpha}\right)D1,$$

where D1 is the diameter of the first pulley; D2 is the diameter of the second pulley; (2*α) is the total rotation of the linkage in movement between the first and second positions; and the first member rotates approximately 180 degrees between the first and second positions.

In some embodiments, the at least one line is anchored to each of the first pulley and the second pulley to form two line sections of equal length, each of the line sections being anchored to the first pulley and the second pulley.

In some embodiments, when the device is in the first position, the first line section is wrapped substantially around the first pulley and substantially unwrapped from the second pulley, and the second line section is substantially unwrapped from in the first pulley and wrapped partially around the second pulley, and when the device is in the second position, the second line section is wrapped substantially around the first pulley and substantially unwrapped from the second pulley, and the first line section is substantially unwrapped from in the first pulley and wrapped partially around the second pulley.

In some embodiments, the first pulley and the second pulley do not protrude above the first member or below the second member in both the first position and the second position.

In some embodiments, the first pulley comprises a hole through which the at least one line passes, the at least one line being anchored to the first pulley within the hole.

In some embodiments, the motion constraint mechanism comprises a gear system, the first node comprising a first gear of the gear system, the second node comprising a second gear of the gear system, and the rotation transfer mechanism comprising at least one further gear meshed intermediate the first gear and the second gear.

In some embodiments, the at least one further gear meshed intermediate the first gear and the second gear comprises an odd number of gears.

In some embodiments, movement of the first member with respect to the second member between the first position and the second position comprises a rotation of the first member of about 180 degrees.

In some embodiments, the first member further comprises interface elements on the first surface.

In some embodiments, the second member comprises a protective cover.

According to one aspect of the disclosure, there is provided a mobile electronic device comprising: a first member having a first surface and a second surface opposite to the first surface; a second member; and at least one linkage mechanism coupling the first member and the second member such that the device may be moved between a first position and a second position, the at least one linkage mechanism comprising: a linkage intermediate the first member and the second member; and a motion constraint mechanism that constrains movement of the first member with respect to the second member between the first and second positions to a pre-defined rotational and translational path, the rotational and translational path being defined by a rotation of the first member with respect to the second member and a counter-rotation of the linkage with respect to the second member, wherein the pre-defined path of the first member comprises about 180 degrees of rotation with respect to the second member with the first member being in approximately a same lateral position in both the first position and the second position.

According to one aspect of the disclosure, there is provided an assembly for use with a mobile electronic device, the assembly comprising: a cover member; and at least one linkage mechanism that is attachable to the device, the at least one linkage mechanism, when attached to the device, interconnecting the device and the cover member such that the device and the cover member can be moved relative to each other between: a first position wherein the device overlies the cover member; a second position wherein the device overlies the cover member and the device is rotated about 180 degrees with respect to the first position, the at least one linkage mechanism comprising: a linkage intermediate the device and the cover member; and a motion constraint mechanism that constrains movement of the device with respect to the cover member between the first and second positions to a pre-defined rotational and translational path, the rotational and translational path being defined by a rotation of the device with respect to the cover member and a counter-rotation of the linkage with respect to the cover member.

Other aspects and features of the disclosure will become apparent, to those ordinarily skilled in the art, upon review of the following description of some specific example embodiments.

As described above, a mobile electronic device including interface elements such as a large touchscreen and/or a graphical display may typically include a single main body member and may not provide an opened or closed position to protect the interface elements of the device. Touchscreens, graphical displays, and/or other interface elements may become scratched and/or dirty if unprotected.

The term mobile electronic device as used herein includes, but is not limited to, mobile communication and/or computing devices such as "tablet" computers, internet browsing devices and other similar electronic devices.

As described herein, first and second body members of a device may be commonly referred to as top and base members respectively. Throughout the disclosure, movement of the device will be described from the point of view of the top member of the device moving with respect to a stationary base member. However, the terms "top member" and "base member", as well as their relative orientation described herein, are used for ease of description only. The device described herein is not limited to any particular orientation in use.

In some embodiments, the top member is a tablet computing device. The top member may include a touchscreen, graphical display, a keyboard and/or other interface elements. The term "interface elements" as used herein may include one or more interactive user interfaces such as a touch screen, keys, a control surface, etc. No particular one type of element described above is required to constitute interface elements as referred to herein. A graphical display could also be provided in combination with other interface elements or alone on a surface of the device as described above. It is to be understood that the term "interface elements" includes a sole graphical interface and embodiments are not limited to interface elements which accept input from a user.

The base member may be a protective cover for protecting interface elements (such as a touchscreen) on the top member. In some embodiments, the base member may also include interface elements, although the specific example embodiments described herein with reference to the figures do not include interface elements on the base member.

For a tablet computing device having a protective cover, the term "opened position" may refer, for example, to a position in which a surface of the tablet computing device having a touchscreen, display or other interface elements is accessible. The protective cover may cover the opposite surface of the tablet computing device in an opened position. The term "closed position" may refer, for example, to a position in which the protective cover is covering the surface having a touchscreen, display or other interface elements, thus rendering the surface inaccessible.

An example embodiment of the device according to the disclosure will now be explained with reference to FIGS. 1 to 16.

FIG. 1 is a top perspective view of a mobile electronic device 100 according to one embodiment. The device 100 is shown in a first position in FIG. 1. The device 100 can be moved to a second position, as will be discussed below. The first and second positions of the device 100 may be referred to as opened and closed positions respectively. The device 100 includes a top member 102 having a first top member surface 104 and a second top member surface 106 (shown in FIGS. 9 to 16) opposite to the first top member surface 104. The device 100 also includes a base member 108. The device 100 further includes at least one linkage mechanism (including the linkage mechanism 110) coupling the top member 102 and the base member 108 such that device 100 may be moved between the opened position and the closed position. The linkage mechanism 110 includes a linkage 112 intermediate the top member 102 and the base member 108. The linkage mechanism 110 also includes a motion constraint mechanism 114 that constrains movement of the top member 102 with respect to the base member 108 between the opened and closed positions to a pre-defined rotational and translational path, the rotational and translational path being defined by rotation of the top member 102 with respect to the base member 108 and counter-rotation of the linkage 112 with respect to the base member 108. When the device 100 is in the opened position, the top member 102 overlies the base member 108 with the second top member surface 106 facing toward the base member 108 (i.e. the second top member surface 106 is covered by the base member 108). The first top member surface 104 is accessible and faces away from the base member 108. When the device 100 is in the closed position, the top member 102 overlies the base member 108 with the first top member surface 104 facing toward the base member 108 (i.e. the first top member surface 104 is covered by the base member 108 in this embodiment). The second top member surface 106 is accessible and faces away from the base member 108.

As will be described below, the motion constraint mechanism 114, in this embodiment, includes a pulley system intermediate the top member 102 and the base member 108. However, as is also discussed below, various other types of motion constraint mechanisms may be used, and the pulley system is provided herein only as an example. For example, the motion constraint mechanism may include a gear system, a sprocket system, a rack and pinion system. For example, a rack and pinion system could include two racks attached to the base member and a pinion fixed to the top member that is coupled to the two racks. In embodiments including a pulley system, the pulley system may be arranged differently than the system described below. For example, more or less pulleys may be used, and the positioning, size, and type of pulleys used may vary.

The linkage mechanism 110 described herein provides a controlled movement of the device 100 wherein, whenever the device 100 is opened or closed, the movement of the top member 102 is constrained such that the top member 102 transcribes the same translational and rotational path throughout the entire movement between the opened position and the closed position. The motion constraint mechanism 114 transfers the rotation of the top member 102 to the counter-rotation of the linkage 112. The motion constraint mechanism 114 also transfers the counter-rotation of the linkage 112 to the rotation of the top member 102. Thus, the motion control mechanism 114 couples the rotation of the top member 102 with the counter-rotation of the linkage 112.

The result of this rotational coupling is that, for any point of the rotation of the top member 102 with respect to the base member, the translational position of the top member 102 is defined. Thus, the top member 102 follows a unique, predetermined or pre-defined rotational and translational path for movement between the closed and opened positions. In this embodiment, the pre-defined path of the top member includes approximately 180 degrees or rotation with respect to the base member with the top member 102 being in approximately the same lateral position in both the opened position and the closed position. This pre-defined path is described in more detail below. The path may vary in other embodiments. For example, the rotation of the top member, and/or its relative positioning in the opened and closed positions may be different.

The device 100, including linkage mechanism 110, is provided as an example. The specific structural details of the top member 102, the base member 108 and the linkage mechanism 110 shown in FIG. 1 and described below are not necessarily present in other embodiments.

The device 100 has a first device end 116, an opposite second device end 118, a first device side 120 and an opposite second device side 122. The distance from the first device end 116 to the second device end 118 is referred to herein as the length of the device 100. The distance from the first device side 120 to the second device side 122 is referred to herein as the width of the device. In this embodiment, the length of each of the top member 102 and the base member 108 is approximately equal to the length of the device 100, although the base member 108 has a slightly longer length than the top member 102, as will be discussed below.

The direction extending from the first device end 116 to the second device end 118 is referred to herein as the forward direction and the opposite direction is referred to herein as the backward direction. The direction extending perpendicularly away from the base member 108 toward the top member 102 is referred to herein as the upward direction and the opposite direction is referred to herein as the downward direction. An orientation in the upward and/or downward direction may be referred to as vertical. These directions are used herein for ease of description only and do not limit the orientation of the device during use.

In this embodiment, the top member 102 is a generally rectangular member having two substantially flat, opposite surfaces, namely the first top member surface 104 and the second top member surface 106 (shown in FIGS. 9 to 16). The top member has a first top member end 124, an opposite second top member end 126, a first top member side 132 and an opposite second top member side 134. FIG. 1 shows a length L of the top member 102 between the first top member end 124 and the second top member end 126.

The top member 102 may include interface elements. For example, in this embodiment, the first top member surface 104 includes a touchscreen 136 that covers most of the first top member surface 104. In other embodiments, the touchscreen is omitted and one or more different interface elements are present instead. For example, in some embodiments, the first top member surface 104 includes a graphical display, a keyboard and/or other interface elements. In this embodiment, the second top member surface 106 has no interface elements. However, in other embodiments, one or more interface elements are present on both the first and second top member surfaces 104 and 106 of the top member, or possibly, only on the second top member surface 106.

In some embodiments, the top member includes a means on the first top member end 124 and/or the second top member end 126 to provide an accessible location for a finger to grip the top member 102 in order to move the device from either the opened position or the closed position. For example, the embodiment shown in FIG. 1 includes a flange 138 that extends from the first top member end 124. However, the flange 138 is optional and may be omitted.

Figure 2:
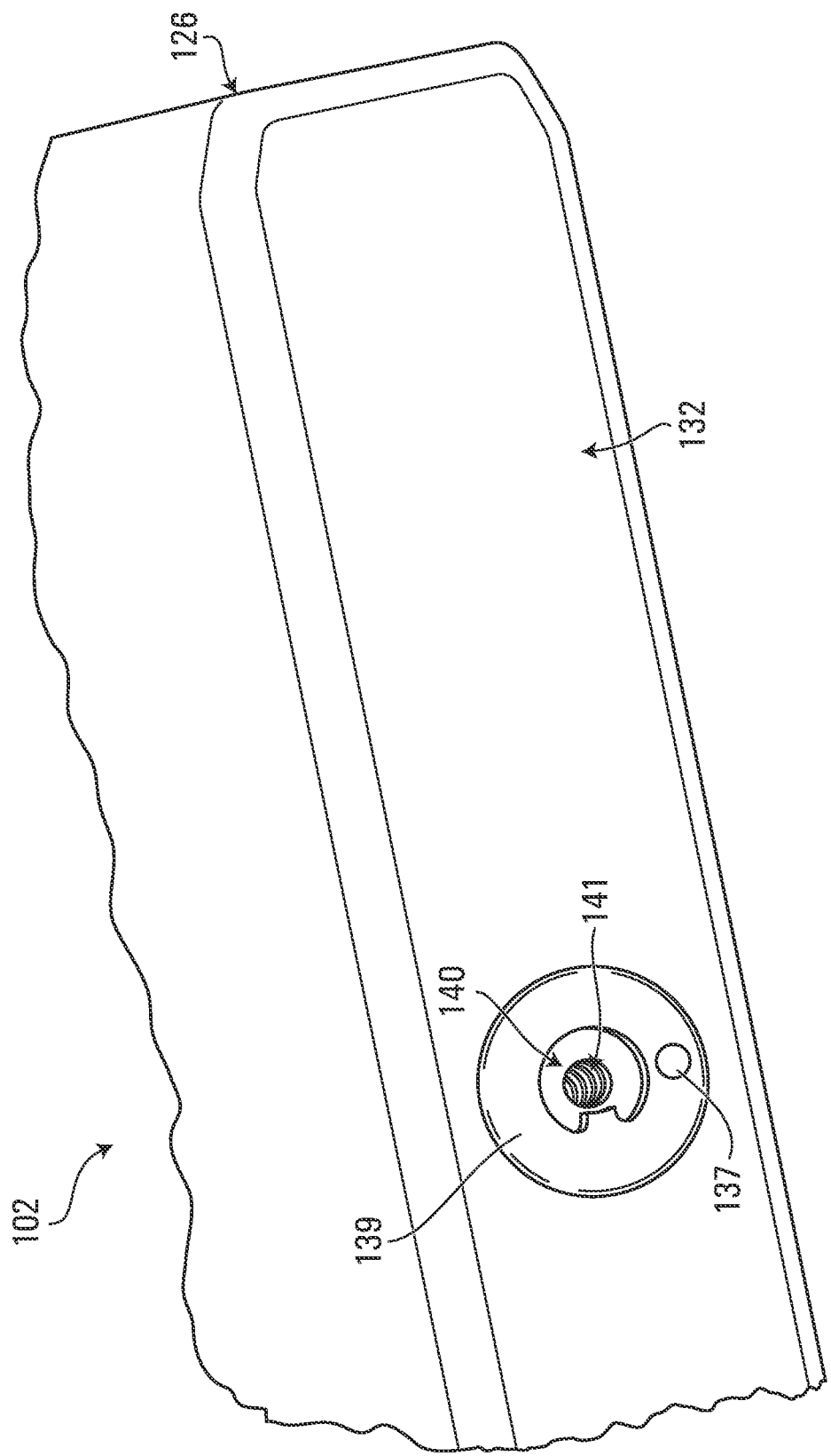
FIG. 2 is a partial enlarged side perspective view of a top member of the device of FIG. 1.

To connect the linkage mechanism 110 to the top member 102, FIG. 2 shows a partial enlarged side perspective view of the top member 102. As seen in FIG. 2, the top member 102, in this embodiment, includes a circular section 139, which protrudes outward slightly from the first top member side 132. The circular section 139 is located less than one quarter of the length L (shown in FIG. 1) from the second top member end 126. A pulley interlock recess 140 is centrally located in the circular section 139. The pulley interlock recess 140 is discussed below (with reference to FIG. 4) in more detail. A top member threaded hole 141 is centrally located in the pulley interlock recess 140. Although not shown, a corresponding mirrored copy of the circular section 139, including the pulley interlock recess 140 and the top member threaded hole 141, is located on the second top member side 134 in this embodiment. As will be discussed below, the circular section 139, the pulley interlock recess 140 and the top member threaded hole 141 are for connecting the linkage mechanism 110 to the top member 102. The linkage mechanism 110 may be attached to the top member 102 in various ways, and the threaded hole 141 and the pulley interlock recess 140 are provided only for an example of how and where the linkage mechanism 110 may be attached to the top member 102.

FIG. 2 also shows a top member magnet 137, which will be described in further detail below. The top member magnet 137 is inset in the circular section 139 so as not to protrude out from the circular section 139. The top member magnet 137 is optional and, in other embodiments, may be omitted.

Turning back to FIG. 1, the base member has a first base member end 142, an opposite second base member end 143, a first base member side 157 and an opposite second base member side 158.

In some embodiments, the base member is a protective cover. For example, in the embodiment shown in FIG. 1, the base member 108 includes a substantially flat protective cover section 144 (also shown in FIG. 3) that is shaped to cover the first top member surface 104 and the second top member surface 106 of the top member 102 depending on whether the device 100 is in the opened position or the closed position. The cover section 144 has a first cover surface 146 (shown in FIGS. 9 and 10 to 16) and an opposite second cover surface 148 (shown in FIG. 3). The base member 108 further includes a first end cover 152 and a second end cover 154 which extend upward from the first base member end 142 and the second base member end 143 respectively. The first end cover 152 and the second end cover 154 are shaped to cover the first top member end 124 and the second top member end 126 when the device 100 is in the closed position and when the device 100 is in the opened position. The first end cover 152 and the second end cover 154 provide clearance for the top member 102 as the device 100 is moved between the opened position and the closed position. Thus, the base member 108 is longer than the top member 102 by slightly more than the total thickness of the first end cover 152 and the second end cover 154. The first end cover 152 and the second end cover 154 are provided with a first recess 155 and a second recess 156 (shown in FIG. 3) respectively that are shaped and positioned to provide clearance for the flange 138 and to provide room for the user of the device 100 to place a finger under the flange 138 to either open or close the device 100. One skilled in the art will appreciate that the base member 108 could alternatively not include the first end cover 152 and the second end cover 154.

In other embodiments, the base member is a different size or shape than the base member 108 shown in FIG. 1. For example, in some embodiments, the base member is smaller than and/or offset from the first and second top member surfaces such that the base member does not completely cover the first or second top member surface. In some embodiments the base member includes a window or other cut-out or opening such that the first top member surface 104 and the second top member surface 106 are visible and/or accessible through the base member 108. Numerous other variations are also possible.

Figure 3:
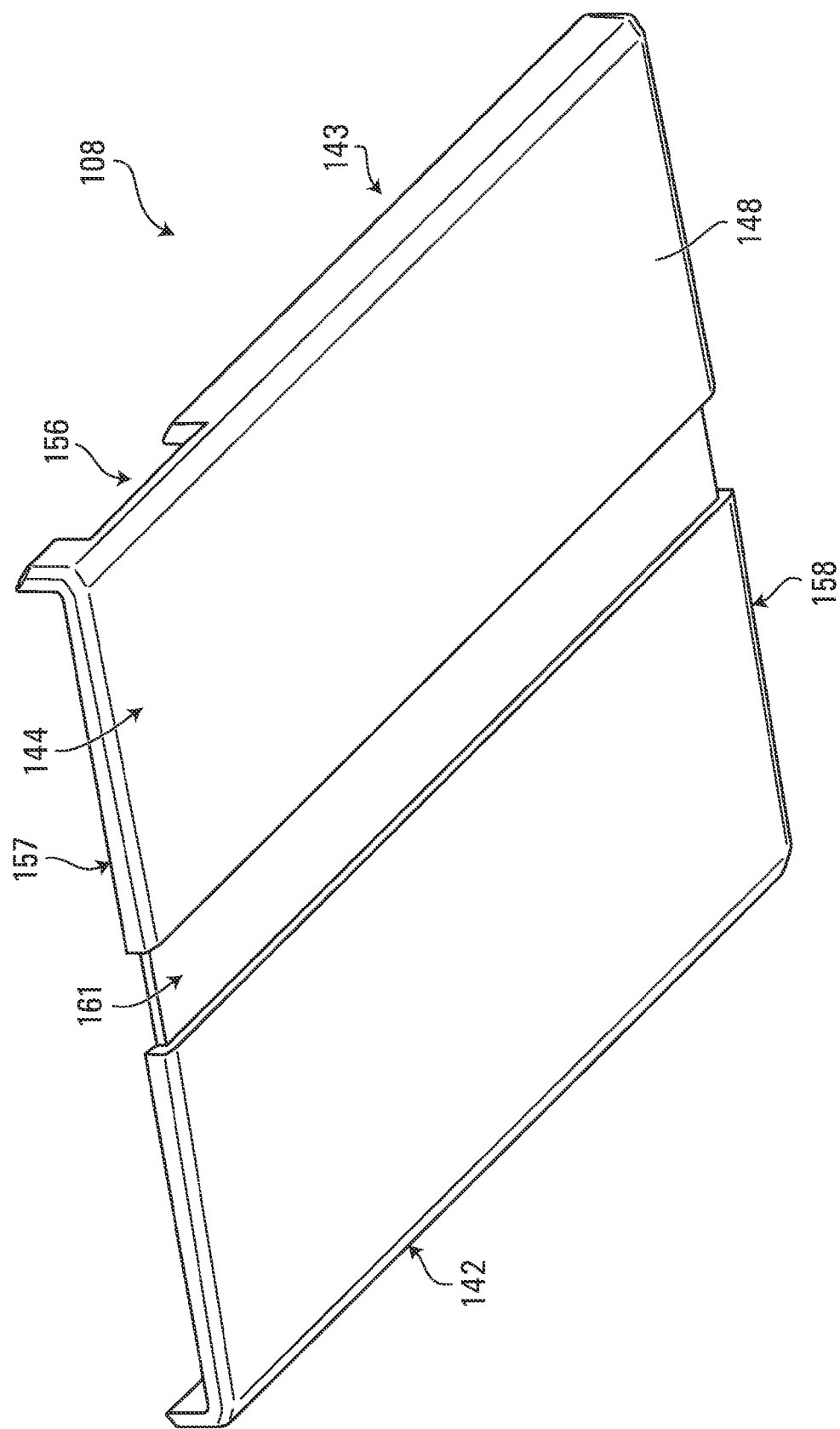
FIG. 3 is a bottom perspective view of a base member of the device of FIG. 1.

FIG. 3 is a partial enlarged bottom perspective view of the base member 108. As shown in FIG. 3, in this example embodiment, the second base member surface 148 is provided with a base member groove 161 that extends from the first base member side 157 to the second base member side 158. The base member groove 161 is located centrally between the first base member end 142 and the second base member end 143. As will be described below, the base member groove 161 is provided in this embodiment for the purpose of attaching pulleys to the base member. However, in other embodiments the base pulley is attached by other means, and still other embodiments do not include any pulleys. Thus, in other embodiments, the base member groove 161 is omitted.

Turning back to FIG. 1, in some embodiments, the ends and sides of the top member and base member of the device are not completely flat. For example, in the embodiment shown in FIG. 1, the top member end 124, the second top member end 126, the first top member side 132 and the second top member side 134 are bevelled. However, the top member and the base member may be differently shaped. For example, the ends and sides of the top and base members could be rounded in other embodiments.

In this embodiment, the top member 102 and the base member 108 have approximately the same width and similar lengths. However, in other embodiments, the top member and the base member are not similarly shaped in this manner. Various configurations of the top and base members of the device according to the disclosure are possible. For example, the base member may not completely cover either of the surfaces of the top member. In some embodiments, the sides and/or ends of the base member is a protective cover that may wrap up the sides and/or ends of the top member, leaving just one of the first and/or second top member surfaces exposed when it is stowed. In some embodiments, the base member is not removable from the device. In other embodiments, the base member is an optional accessory. If the base member is sold as an optional accessory, it may be adapted, along with the linkage mechanism, to be attachable to, and possibly removable from, the top member (e.g. a snap on/off feature).

Figure 15:
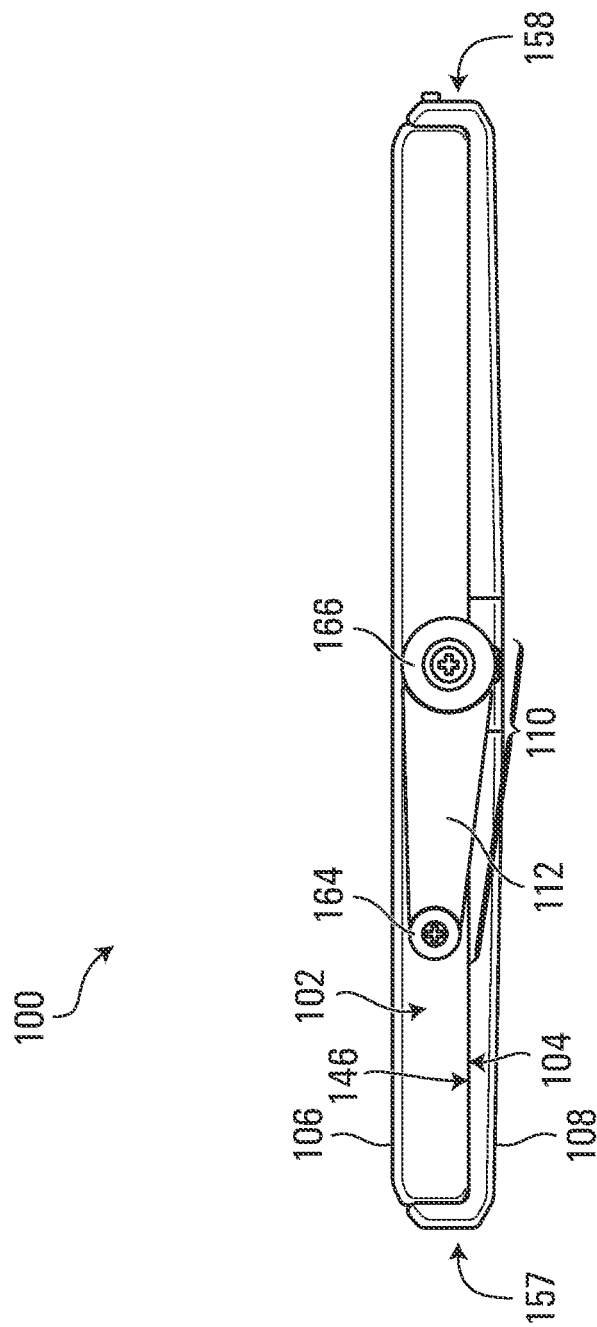
FIG. 15 is a side view of the device of FIG. 1 in a closed position.

In this embodiment, the top member 102 and the base member 108 are substantially aligned in each of the opened position (shown in FIG. 1) and the closed position (shown in FIG. 15). However, in other embodiments, the top member and the base member are not substantially aligned, either due to the relative sizes and/or positions of the top and base members.

The at least one linkage mechanism 110 includes two or more linkage mechanisms in some embodiments. Some embodiments include a pair of linkage mechanisms, wherein each linkage mechanism is at a respective side of the device. For example, in this embodiment, the linkage mechanism 110 is a first linkage mechanism that is located on the first device side 120. A second linkage mechanism 162 (shown in FIG. 14), which mirrors the linkage mechanism 110 in form and function, is located at the second device side 122. However, in other embodiments, only one linkage mechanism is provided rather than a mirrored pair of linkage mechanisms. For example, a linkage mechanism could be provided on one side of the device while a simple bar, band, or other type of linkage could be used on the opposite side of the device. As another example, a single linkage mechanism could be located centrally along the width of the device. In still other embodiments, more than two linkage mechanisms are provided. In embodiments in which a pair of linkage mechanisms is provided, one of the pair of linkage mechanisms does not necessarily mirror the other in form and/or function.

For simplicity, only the linkage mechanism 110 on the first device side 120 will be described in detail herein. The linkage mechanism 110 is shown by way of example only, and other embodiments employ different linkage mechanisms rather than the linkage mechanism 110 shown in FIG. 1.

Elements of the linkage mechanism 110 of this embodiment will now be discussed in greater detail with reference to FIGS. 1, 4 and 5.

The linkage mechanism 110 shown in FIG. 1 includes the linkage 112 and the motion constraint mechanism 114. In some embodiments, the motion constraint mechanism 114 includes a first node, a second node, and a rotation transfer mechanism. The first node may be fixedly attached to the first device side 132, the linkage 112 being rotatably coupled to the top member at the first node. The second node may be fixedly attached to the first base member side 157, the linkage 112 being rotatably coupled to the base member 108 at the second node. The linkage, in this embodiment, has a fixed length, although some embodiments may employ linkages that have varying lengths. For example telescoping linkages, or linkages which have dynamic points of connection to the top and/or base members, thereby changing the linkage length, may be employed in some embodiments. The rotation transfer mechanism may be adapted to rotationally couple the first node and the second node to thereby transfer the rotation of the top member 102 to the counter-rotation of the linkage 112 and vice versa.

The first node may have a perimeter about an axis of rotation of the top member (where the linkage is rotatably coupled to the top member), and the second node may have a perimeter about an axis of rotation of the linkage (where the linkage is rotatably coupled to the base member). For example, each of the first and second nodes may include a pulley, gear or sprocket. The first and second nodes, however, are not restricted to elements having a circular cross-section, and other elliptical, oval, or otherwise shaped elements having a perimeter may be used. The rotation transfer mechanism may include a flexible link that is wrapped around at least a portion of each of the perimeters of the first node and the second node, and which is anchored to each of the first and second nodes such that the flexible link cannot slip or shift with respect to the perimeter. In some embodiments, a slip prevention mechanism such as an anchor may be used to prevent such slipping or shifting. The flexible link may be a line of a pulley system (such as a tension wire or belt) that is at least partially wrapped around the pulleys. In the case of a sprocket system, the flexible link could be a chain at least partially wrapped around the sprockets. The flexible link could also be any other suitable element for rotatably coupling the first and second nodes. In the case of the sprockets and the chain, the interaction between teeth of the sprocket and the chain may prevent shifting or slipping of the chain with respect to the sprockets. In the case of pulleys and a wire, screws or other anchoring means may be employed to anchor the wire to the pulleys. In other embodiments, the tension of the wire may be sufficient that the friction between the wire and the pulleys may provide a sufficient anchor.

In some embodiments, as described above, the motion constraint mechanism 114 includes a pulley system, wherein the first and second nodes are pulleys. For example, in this embodiment, a first pulley 164 (shown in FIG. 4) of the pulley system forms the first node that is fixedly attached to the first top member side 132, the linkage 112 being rotatably coupled to the top member 102 at the first node. A second pulley 166 (shown in FIG. 4) of the pulley system forms a second node that is fixedly attached to the first base member side 157, the linkage 112 being rotatably coupled to the base member 108 at the second node.

In this embodiment, the flexible link forming the rotation transfer mechanism is the tension wire 168 (shown in FIG. 1) of the pulley system. As will also be described below, the tension wire 168 is anchored to the first pulley 164 and the second pulley 166 to prevent slippage or lateral movement of the tension wire with respect to the first and second pulleys 164 and 166. The tension wire 168 is provided as an example line for a pulley system. Any line for use with pulleys that can maintain sufficient tension may be used. For example, the line, in some embodiments, may be a belt, rope, cable etc. Embodiments are not limited to any particular type of line for coupling the pulleys.

The pulley system described with reference to FIGS. 1 to 16 is only one example of a possible motion constraint mechanism. One skilled in the art will appreciate that many variations to the mechanism described herein may be made while maintaining the same or similar functionality.

Figure 4:
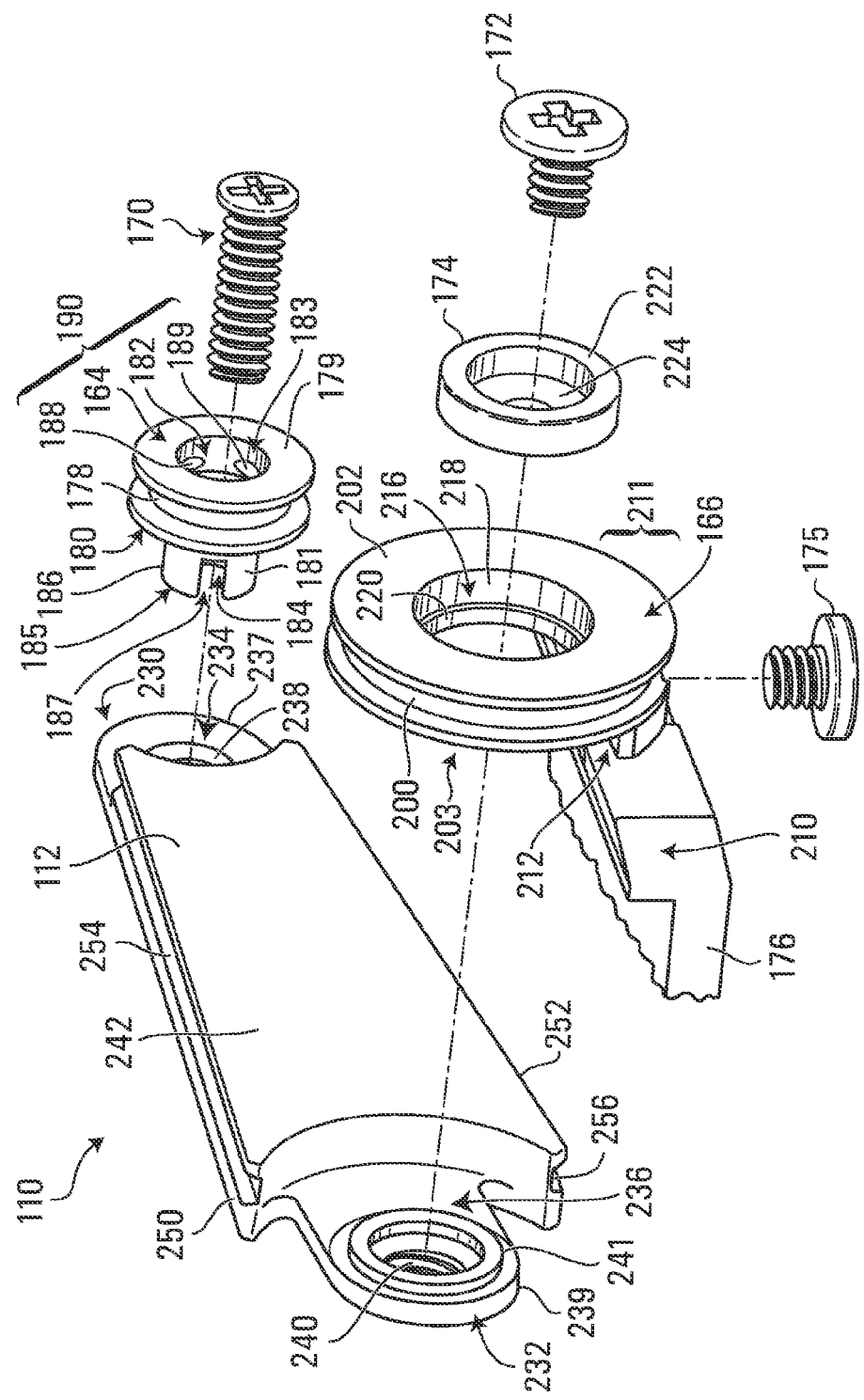
FIG. 4 is an exploded view of some elements of a linkage mechanism of the device of FIG. 1.

FIG. 4 is an exploded view of some elements of the linkage mechanism 110. FIG. 4 shows the linkage 112, the first pulley 164 and the second pulley 166. FIG. 4 also shows a first screw 170, a second screw 172, a stepped bush 174, an anchor screw 175, and a pulley support strip 176.

The first pulley 164, in this example, is a circular pulley with a first groove 178 extending around its circumference. The first groove 178 is sufficiently wide for the tension wire 168 to be wrapped around the first pulley 164 twice without the tension wire 168 overlapping itself. The first pulley 164 includes a first pulley outer face 179 and a first pulley inner face 180 opposite to the outer face 179.

In this particular example, the first pulley 164 includes a first pulley stepped hole 182 (i.e. a hole with a larger diameter portion 183 and a smaller diameter portion 184). The first pulley stepped hole 182 extends from the first pulley outer face 179 completely through the first pulley. The large diameter portion 183 of the first pulley stepped hole 182 extends inward from the first pulley outer face 179 partially through the first pulley 164. The diameter of the stepped hole 182 then changes to a smaller diameter and the smaller diameter portion 184 extends the rest of the way through the first pulley 164 to the first pulley inner face 180. The first pulley stepped hole 182 is sized to allow the first screw 170 to attach the first pulley 164 to the top member 102 such that the first screw 170 does not protrude from the first pulley outer face 179 when assembled.

The first pulley 164 includes a first pulley shaft 181 that extends from the first pulley inner face 180 and terminates at a first pulley shaft face 185, which is substantially flat. In this example, the first pulley shaft 181 has a diameter that is less than the diameter of the first pulley inner face 180. The first pulley shaft 181 is generally circular with the smaller diameter portion 184 of the first pulley stepped hole 182 extending through its length. The first pulley shaft 181 includes an end portion 186 with a cut-out 187 that extends along a small portion of the circumference of the first pulley 164 through to the first pulley stepped hole 182. The pulley interlock recess 140 (shown in FIG. 2) is shaped to receive the end portion 186 of the first pulley shaft 181.

In this example embodiment, the first pulley 164 includes a first wire hole 188 and a second wire hole 189. When the first pulley 164 is in the orientation shown in FIG. 1, which is the orientation of the first pulley 164 when the device 100 is in the opened position, the first wire hole 188 extends from the larger diameter portion 183 of the stepped hole 182 upward to the first groove 178. The second wire hole 189 extends from the larger diameter portion 183 of the stepped hole 182 downward to the first groove 178. The first wire hole 188 and the second wire hole 189 are approximately concentric. The first wire hole 188 and the second wire hole 189 will collectively be referred to herein as simply the wire hole 190, which extends straight through the first pulley 164. The wire hole 190 is located off-centre with respect to a circular cross-section of the first pulley 164. The wire hole 190 is sized to receive the tension wire 168 (shown in FIG. 1). As will be explained below, the wire hole 190 provides a means to anchor the tension wire 168 to the first pulley. However, one skilled in the art will appreciate that other methods of anchoring the tension wire 168 could be implemented in other embodiments. For example, the wire hole 190 could include a narrow section which places sufficient frictional force on the tension wire 168 to hold the tension wire 168 in place. Alternatively, the tension wire 168 could be welded to the first pulley 164 or attached with an adhesive, for example.

The second pulley 166, in this example embodiment, is a circular pulley that includes a second groove 200 that extends around the circumference of the second pulley 166. The second groove 200 is sized such that the tension wire 168 can wrap around the second pulley 166 in the second groove 200. As described above, various means may be provided in other embodiments to attach the pulleys to the base member 108. In this particular example, the pulley support strip 176 is provided, which is shaped to fit in and be attached to the base member groove 161 (shown in FIG. 3). The pulley support strip 176 has an end 210 that covers the first base member side 157 (shown in FIG. 3). The second pulley 166 is parallel to the first device side 120 (shown in FIG. 1). The second pulley 166 is formed integral to and extends upward from the end 210 of the pulley support strip 176 with sufficient clearance for the linkage 112 to be received both between the second pulley 166 and the base member 108 and between the second pulley 166 and the top member 102. In particular, the second pulley 166 has a second pulley outer face 202 and a second pulley inner face 203 opposite to the second pulley outer face 202. The second pulley 166 has a lower portion 211, which is attached to the end 210 of the pulley support strip 176 by an extension 212 from the second pulley inner face 203 to the end 210 of the pulley support strip 176.

The second pulley 166 includes a second pulley stepped hole 216 that is centrally located with respect to the second pulley outer and inner faces 202, 203. A larger diameter portion 218 of the second pulley stepped hole 216 extends inward from the second pulley outer face 202. The diameter of the second pulley stepped hole 216 changes and a smaller diameter portion 220 extends the rest of the way to the second pulley inner face 203. The stepped bush 174 includes a wide bush portion 222 and a narrow bush portion 224. The wide bush portion 222 and the larger diameter portion 218 of the second pulley stepped hole 216 are shaped such that the wide bush portion 222 fits within the larger diameter portion 218 of the second pulley stepped hole 216.

An anchor screw hole 228 (shown in FIG. 6) extends upward into the lower pulley portion 211 and is adapted to allow the anchor screw 175 to anchor the tension wire 168 to the second groove 200.

In some embodiments, a ratio of the diameter of the second pulley 166 to the diameter of the first pulley 164 is greater than, but close to 2:1. As will be explained below, the ratio may be greater than, but close to 2:1 so that proper rotation of the top member 102 and the linkage 112 with respect to the base member 108 is achieved when the device is opened or closed. In this particular embodiment, the diameter of the first pulley 164 is approximately 3.5 mm and the diameter of the second pulley 166 is approximately 7.16 mm. The mathematical relationship of the relative diameters of the first pulley 164 and the second pulley 166 to the desired movement of the device 100 is discussed in more detail below.

The particular shape, size, groove type, and other structural details of the first pulley 164 and the second pulley 166 may vary. The specific first pulley 164 and second pulley 166 described herein are provided as examples. Any suitable pulley for coupling rotation from one member to another may be used. In some embodiments, pulleys having oval or otherwise non-circular shapes are used. If non-circular pulleys are employed, the mathematical relationship described below may require suitable alteration. As another example, the pulleys may have a V-shaped groove or any other suitable groove shape.

The linkage 112 is an elongated member having a first linkage end 230 and a second linkage end 232. The linkage also has an outer linkage surface 242 and an inner linkage surface 244 (shown in FIG. 5) opposite to the outer linkage surface 242. The linkage 112, in this example, is not flexible and does not bend or change length. A first linkage end section 234 is located at the first linkage end 230. A second linkage end section 236 is located at the second linkage end 232. Each of the first linkage end section 234 and the second linkage end section 236 is generally flat and indented from the outer surface 242. The first linkage end section 234 and the second linkage end section 236 are indented to provide clearance for the first pulley 164 and the second pulley 166. The first linkage end section 234 has a first rounded end edge 237 and a first linkage hole 238. The first linkage hole 238 is shaped to receive the first pulley shaft 181 such that the linkage 112 is rotatable about the first pulley shaft 181. The length of the first pulley shaft 181 is greater than the thickness of the first linkage end section 234, such that the end portion 186 of the first pulley shaft 181 protrudes through the first linkage end section 234 when assembled.

The second linkage end section 236 has a second rounded end edge 239, similar to the first linkage end section 234. The second linkage end section 236 has a second linkage hole 240 which is threaded and shaped to receive the second screw 172.

The second linkage end section 236 includes a lip 241 which is circular and centered around the second linkage hole 240. The lip 241 protrudes outward slightly from the linkage end section 236. The lip 241 is shaped to fit within the smaller diameter portion 220 of the second pulley stepped hole 216, and the narrow bush portion 224 of the stepped bush 174 is shaped to fit within the lip 241.

The linkage 112 further includes a first grooved edge 254 and a second grooved edge 256. The first grooved edge 254 and the second grooved edge 256 are shaped such that the path of the tension wire 168 (shown in FIG. 1) passes through the first grooved edge 254 and the second grooved edge 256 when the tension wire 168 is arranged around each of the first pulley 164 and the second pulley 166. Thus, the first grooved edge 254 and the second grooved edge 256 act as a guard for the tension wire 168 that may prevent a finger of a user from touching the tension wire 168. The first grooved edge 254 and the second grooved edge 256 may also prevent the tension wire from moving out of alignment with the first pulley 164 and the second pulley 166. The linkage 112, in other embodiments, may be a simple straight bar with no protective grooves or other details described above. Any linkage that may be rotatably coupled and has a fixed length (to maintain a constant distance between the first and second node) may be suitable.

Figure 5:
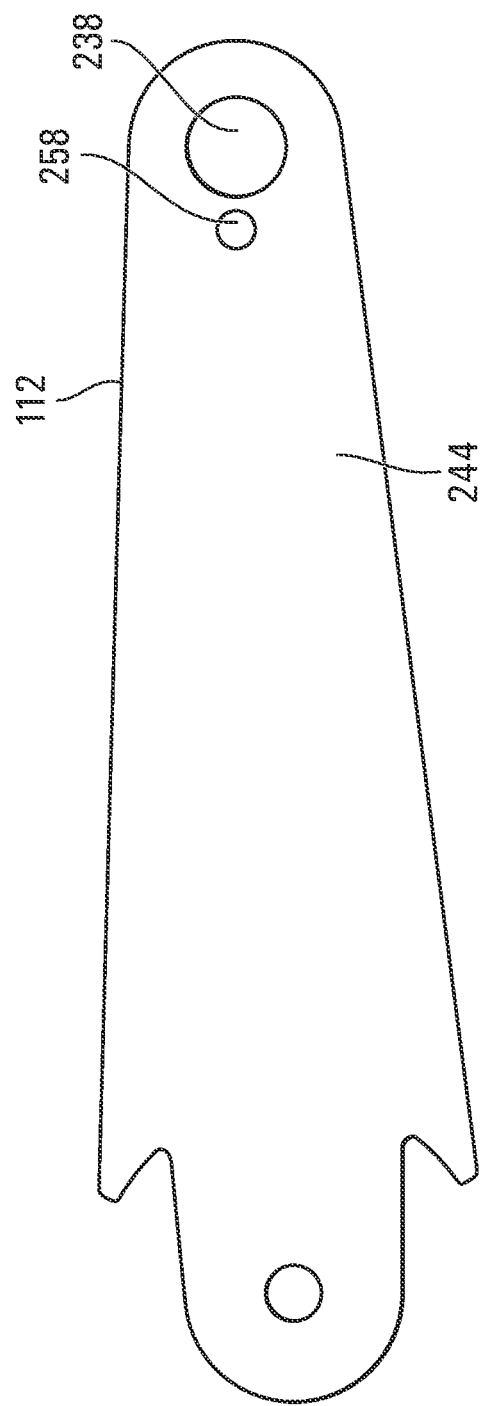
FIG. 5 is a side view of a linkage of the device of FIG. 1.

FIG. 5 is a side view of the linkage 112 showing the inner linkage surface 244. In this embodiment, the linkage 112 includes a linkage magnet 258. The linkage magnet 258 is inset in the inner linkage surface 244 of the linkage 112 so as to be flush with the inner linkage surface 244. The linkage magnet 258 is omitted in other embodiments. The linkage magnet 258 and the top member magnet 137 (shown in FIG. 2) have polarities such that, when the device is assembled as described below, the linkage magnet 258 and the top member magnet 137 will be magnetically attracted to each other when aligned. In this embodiment, the top member magnet 137 and the linkage magnet 258 are arranged in the top member 102 and the linkage 112 respectively, such that they will be aligned when the device 100 is in the first angled position shown in FIGS. 9 and 10. As will be explained below, both the top member magnet 137 and the linkage magnet 258 are optional and are omitted in other embodiments.

The assembly of the device 100 will now be explained with reference to FIGS. 1 to 8.

The first pulley shaft 181 (shown in FIG. 4) is received in the first linkage hole 238 (shown in FIG. 4) and in the pulley interlock recess 140 (shown in FIG. 2). More particularly, the first pulley end portion 186 (shown in FIG. 4) is received in the pulley interlock recess 140. The first screw 170 (shown in FIG. 4) is received in the first pulley stepped hole 182 (shown in FIG. 4) and is tightened into the top member threaded hole 141. The first pulley 164 is thus axially fixed in place on the top member 102 (shown in FIG. 1) by the first screw 170. The first pulley 164 is rotationally fixed to the top member 102 by the interaction between the pulley interlock recess 140 and the first pulley end portion 186. The linkage 112 (shown in FIG. 4) is rotatably coupled to the top member 102 via the first pulley shaft 181. The circular section 139 (shown in FIG. 2) ensures that the linkage 112 has a slight clearance from top member 102 during movement. The first pulley 164 is fixed to the top member 102 such that the wire hole 190 (shown in FIG. 4) is vertical and offset in the forward direction when the device 100 is in the opened position. In this embodiment, the first pulley 164 is also located centrally within the thickness of the top member 102. In other embodiments, however, the first pulley is located off-centre with respect to the thickness of the top member.

The pulley support strip 176 (shown in FIG. 4) is received in and affixed to the base member groove 161 (shown in FIG. 3). The pulley support strip 176 may be affixed in any suitable manner including, but not limited to, one or more screws, an adhesive, welding, etc.

Figure 6:
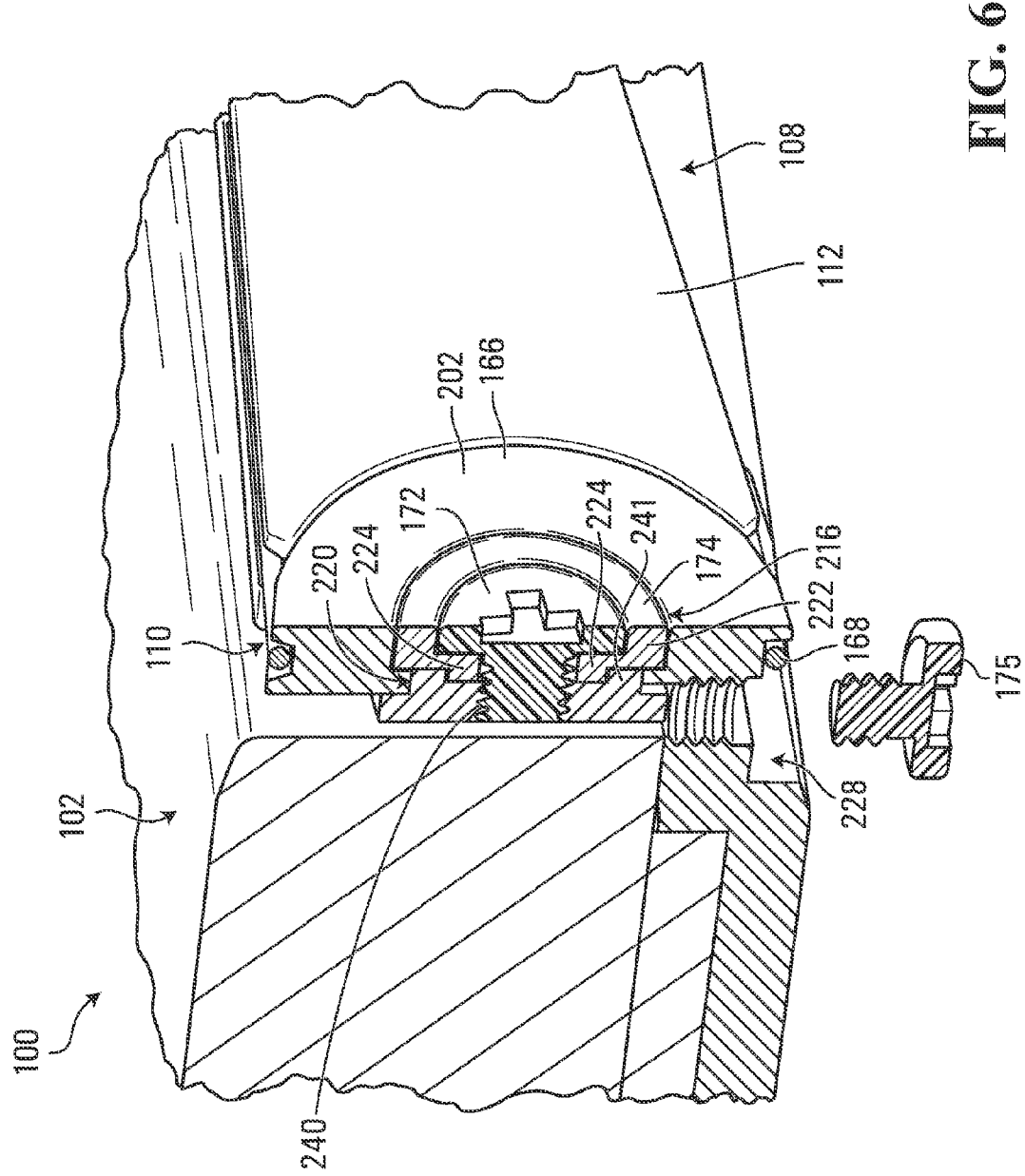
FIG. 6 is a partial enlarged perspective cutaway view of the device of FIG. 1, wherein the device is cut along the lines I-I in FIG. 1.

FIG. 6 is a partial enlarged perspective cutaway view of the device 100, wherein the device 100 is cut along the lines I-I in FIG. 1. The anchor screw 175 is shown in an exploded position. As shown in FIG. 6, the stepped bush 174 is received in the second pulley stepped hole 216 from the second pulley outer face 202, and the lip 241 of the linkage 112 is received in the second pulley stepped hole 216. The narrow bush section 224 meshes with the lip 241 of the linkage 112 in the narrow portion 220 of the stepped hole 216. The second screw 172 is tightened in the second linkage hole 240 and holds the stepped bush 174 together with the linkage 112. The second screw 172, the lip 241 and the stepped bush 174 rotate together with respect to the second pulley 166. Thus, the linkage 112 is rotatably coupled to the base member 108 at the second pulley 166. The anchor screw 175 is received in the anchor screw hole 228 to anchor the tension wire 168 to the second pulley 166.

Figure 7:
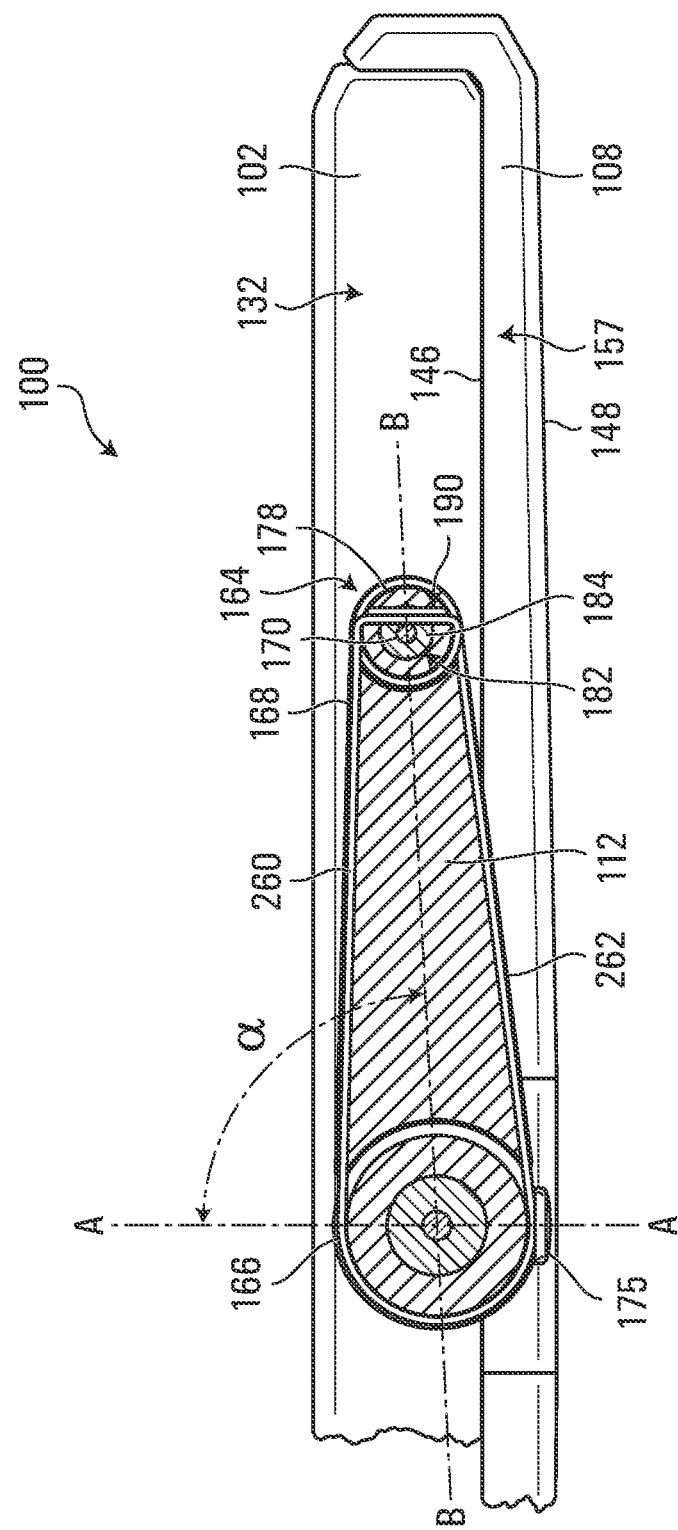
FIG. 7 is a partial enlarged cross-section side view of the device of FIG. 1 taken along the line II-II in FIG. 1.

FIG. 7 is partial cross-section side view of the device 100 taken along the line II-II in FIG. 1. The cross-section is taken through each of the first pulley 164 and the second pulley 166 so that the arrangement of the tension wire 168 is visible. FIG. 7 shows a plane, indicated by the line A-A, which is perpendicular to the first cover surface 146 of the base member 108. A line B-B indicates an axis which travels lengthwise along the linkage 112. The angle α between the lines A-A and B-B may be slightly less than 90 degrees when the device is in the opened position. In this embodiment, the angle α is approximately 86 degrees. As will be discussed below, the angle α indicates half of the angular rotation of the linkage 112 during movement of the device between the closed and opened positions. The exact angle α will vary depending on the dimensions of the device 100 and the arrangement of the pulley system. Thus, embodiments are not limited to any specific angle α or pulley diameters.

As shown in FIG. 7, the first pulley 164 and the second pulley 166, in this embodiment, each have a diameter which is less than the combined thickness of the top member 102 and the base member 108. Thus, when the device 100 is in the opened position and in the closed position the linkage mechanism 110 does not protrude above or below the first device side 120 (i.e. does not protrude above the top member 102 or below the base member 108). In other embodiments, however, the pulleys have different sizes and one or both of the first and second pulleys may protrude above the top member 102 or below the base member 108.

Turning back to FIG. 1, the first node and the second node (i.e. the first pulley 164 and the second pulley 166 in this embodiment) may be fixed to the top member 102 and the base member 108 in positions that will provide sufficient clearance between the first node and the base member 108 for the top member 102 to rotate between the opened and closed positions. Specifically, as will be discussed below, the portion of the top member 102 between the first node and the second top member end 126 will pass between the first node and the base member 108 during the movement.

In this embodiment, the second node (i.e. the second pulley 166) is fixedly attached to the first base member side 157 approximately centrally between the first base member end 142 and the second base member end 143. The first node (i.e. the first pulley 164), in this embodiment, is fixedly attached to the top member side 132 slightly less than one quarter of the length L (shown in FIG. 1) from the second top member end 126. This positioning of the first node provides a distance between the first node and the second node that is over one quarter of the length L. Thus, the distance between the first node and the second node is greater than the distance from the first node to the second top member end 126. As will be discussed below, this positioning provides the required clearance for the top member 102 in this embodiment.

In some embodiments, the first node may be located more than one quarter of the length from the second top member end. However, to provide sufficient clearance for the top member rotation, the base member may include a curved or otherwise shaped recess. In some embodiments, the linkage may be adapted to increase in length during the rotation of the top member to provide the necessary clearance.

However, the positioning of the first node and the second node on the top member 102 and the base member 108 is not limited to the specific positions described above. For example, if the second node is located centrally, as described above, the first node may be positioned closer to, and possibly at, the second top member end. By contrast, in some embodiments, the second node is not centrally located on the side of the base member, and the location of the first node may change accordingly to provide sufficient clearance for rotation of the top member.

Figure 8:
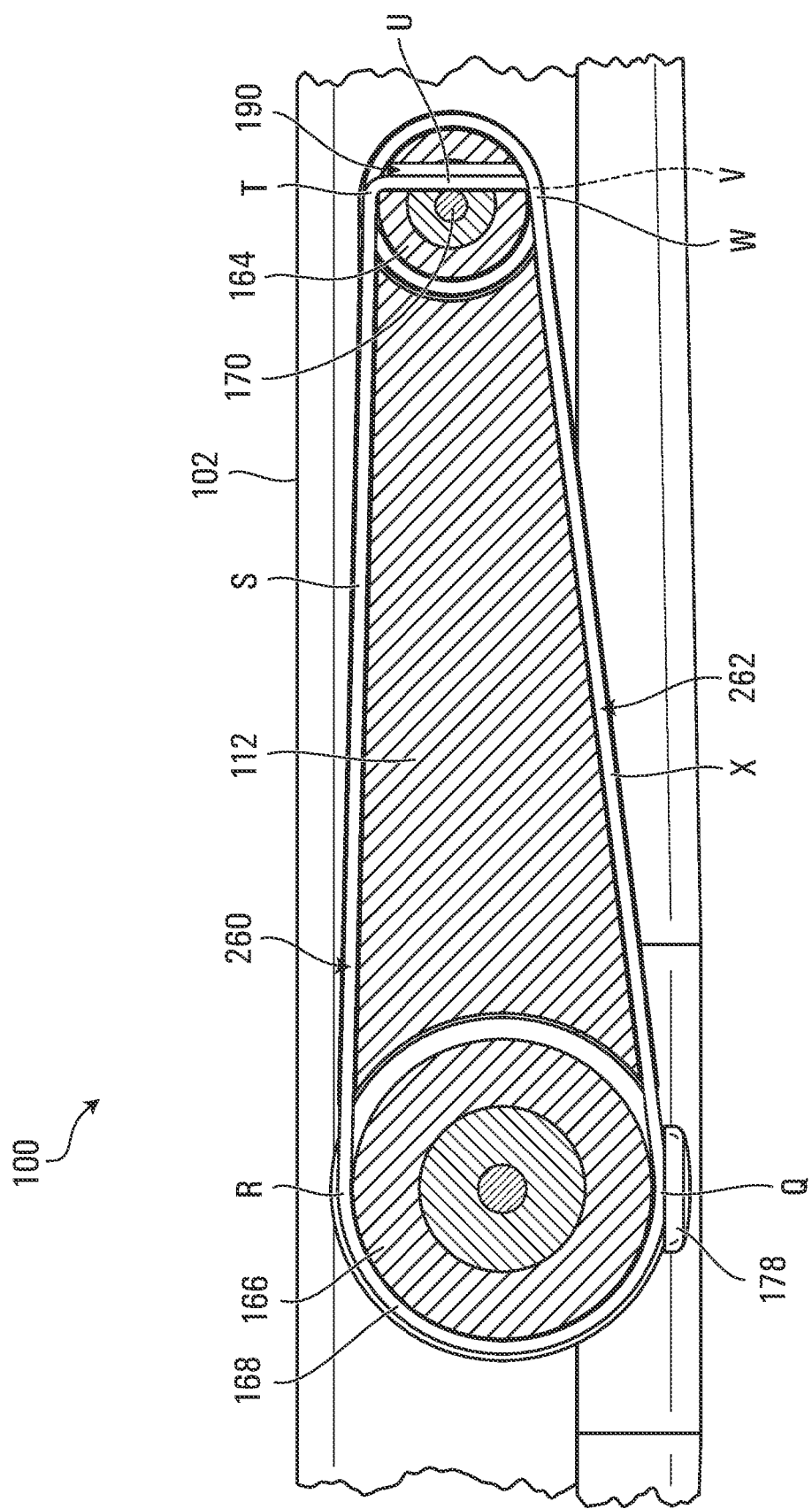
FIG. 8 is a partial enlarged cross-section side view of the device of FIG. 1 wherein the cross-section is in the same plane shown in FIG. 7.

FIG. 8 is an enlarged cross-section view of the device 100 in the opened position where the cross-section is in the same plane shown in FIG. 7. The arrangement of the tension wire 168 is more clearly visible in FIG. 8. The tension wire 168 may be arranged, as in this embodiment, such that it consistently wraps onto the first and second pulleys 164, 166 at a tangent throughout the full range of the movement between the closed and opened positions. The specific arrangement of the tension wire 168 of this embodiment is described in detail below. However, in other embodiments, the tension wire or other pulley line may be arranged differently. The specific arrangement below is described only as an example.

FIG. 8 shows eight points on the tension wire 168 indicated by Q, R, S, T, U, V, W and X. A dotted line is used to designate point V on the tension wire 168 as being hidden from view. The tension wire 168 is anchored to the second pulley 166 at point Q. The tension wire 168 is anchored to the first pulley 164 by the first screw 170 in the wire hole 190 at point U. The specific arrangement of the tension wire 168 is provided as an example, and a wire, belt or other flexible element coupling pulleys may be arranged differently than described herein.

In the opened position, the tension wire 168 exits the wire hole 190 in the upward direction at point T and in the downward direction at point V. As shown in FIG. 7, by offsetting the wire hole 190 in the first pulley 164, the angle that the tension wire 168 bends when emerging from the wire hole 190 (at points T and V) is lowered (i.e. less than 90 degrees) thereby reducing the crimping effect on the tension wire 168. In this embodiment, the tension wire 168 is sized such that high tension is maintained throughout the tension wire 168 throughout the movement of the device 100. The specific means by which the tension wire 168 is anchored to the first pulley 164 and the second pulley 166 is not limited to the first screw 170 and the anchor screw 175 shown in FIG. 8. For example, in other embodiments, the tension wire is anchored by welding or other suitable means.

This arrangement of the tension wire 168, as anchored to the first pulley 164 and the second pulley 166, effectively divides the tension wire 168 into a first half wire section 260 and a second half wire section 262 which are each anchored to the first pulley and the second pulley. In this embodiment, the first wire section 260 and the second wire section 262 have approximately equal lengths, which are fixed. Thus, the first wire section 260 and the second wire section 262 are referred to herein as the first half wire section 260 and the second half wire section 262 respectively. However, in other embodiments, wire sections between anchor points may not be half sections having equal lengths. The first half wire section 260 and the second half wire section 262 effectively act as two links or connections between the first pulley 164 and the second pulley. In some embodiments, separate wires, rather than a single wire, may be used where each separate wire functions similarly to the first half wire section 260 and the second half wire section 262 described herein.

As will be explained below, in this embodiment, the fixed lengths of the first and second half wire sections 260 and 262, and the fixed distance between the first pulley 164 and the second pulley 166 (set by the linkage 112) has the result that rotation of the first pulley 164 (with respect to the base member 108) is transferred to a counter-rotation of the linkage 112, thereby maintaining the path that the top member 102 travels between the opened and closed positions. However, before describing this rotational transfer, further details of the arrangement of the first and second half wire sections 260 and 262, in this embodiment, will be described.

The first half wire section 260 includes: a first wire portion between points Q and R (hereinafter referred to as the first wire portion Q-R); and a second wire portion between points T and S (hereinafter referred to as the second wire portion T-S). The second half wire section 262 includes a third wire portion between points Q and X (hereinafter referred to as the third wire portion Q-X); and a fourth potion between points V and W (hereinafter referred to as the fourth wire portion V-W).

As shown in FIG. 8, when the device is in the opened position, the first half wire section 260 (including the first wire portion Q-R and the second wire portion T-S) is partially wrapped around the second pulley 166 and substantially unwrapped from (but in tangential contact with) the first pulley 164. In particular, the first wire portion Q-R wraps partially around the second pulley 166 (in the clockwise direction starting from the point Q), and the second wire portion T-S is substantially unwrapped from the first pulley 164.

Conversely, the second half wire section 262 (including the third wire portion Q-X and the fourth wire portion V-W) is partially wrapped around the first pulley 164 and substantially unwrapped from (but in tangential contact with) the second pulley 166. In particular, the fourth wire portion V-W is wrapped substantially around the entire circumference of first pulley 164 (in the clockwise direction starting from the point V) and the third wire portion Q-X is substantially unwrapped from the second pulley 166.

As will be explained below, this arrangement of the first and second half wire sections 260 and 262 allows each of these sections to wrap onto the first and second pulleys 164, 166 at a tangent throughout the full range of the movement between the closed and opened positions. This arrangement may, therefore, allow the tension wire 168 to unwrap from and wrap around the first and second pulleys 164 and 166 as needed throughout the movement described below. The pulley system of the device 100 is provided as an example of a pulley system that is arranged to maintain tangential contact between the pulleys and the line coupling the pulleys. Pulley systems in other embodiments may be arranged differently. In other embodiments, a line coupling the pulleys may not wrap onto the pulleys at a tangent.

The operation of the elements of the device 100 will now be described with reference to FIGS. 1 and 7 to 16.

Figure 16:
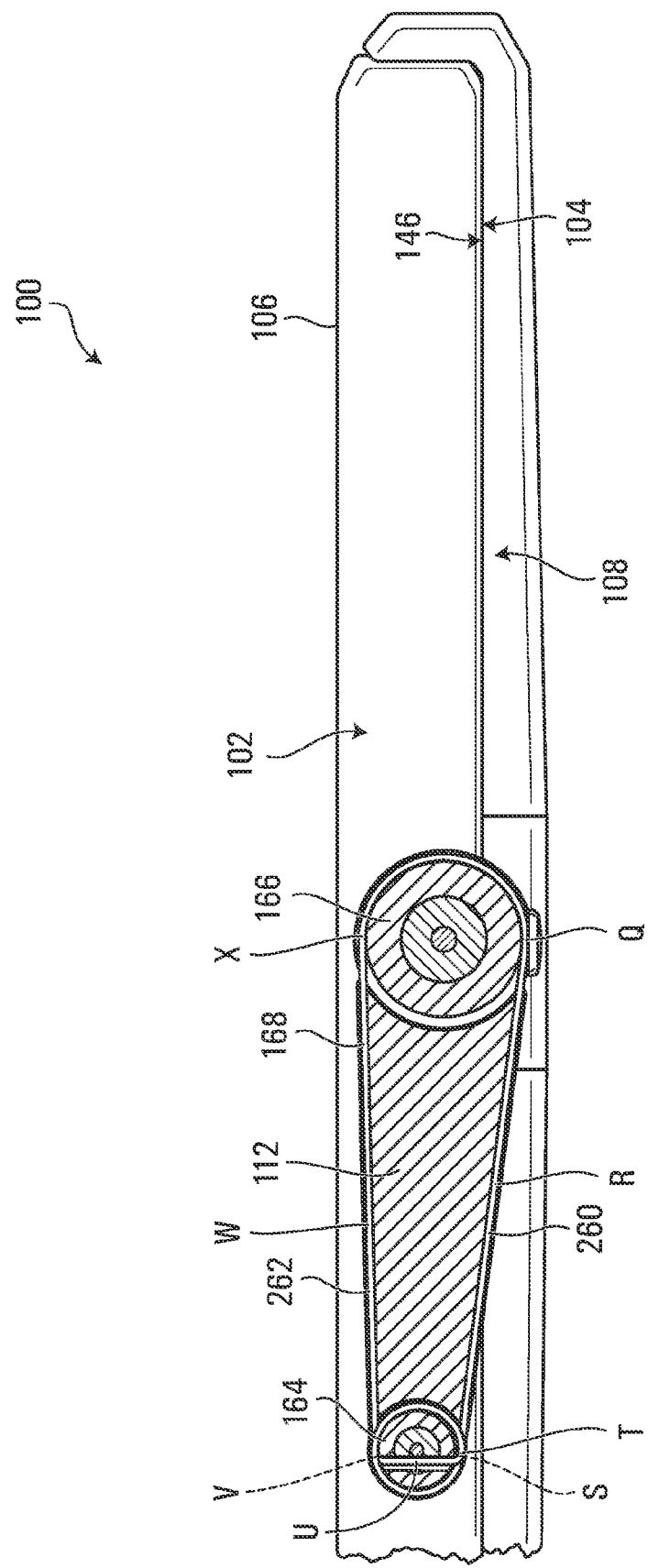
FIG. 16 is a partial enlarged cross-section side view of the device of FIG. 1 in the closed position, wherein the cross section is in the same plane shown in FIG. 7.

FIGS. 1 and 7 show the device 100 in the opened position. In order to move to the closed position, which is shown in FIGS. 15 and 16, the device 100 moves through positions shown in FIGS. 9 to 14 (which are discussed below).

As shown in FIG. 1, in the opened position, the top member 102 overlies the base member 108 and the first top member surface 104 including the touchscreen 136 is accessible. The first top member end 124 is located at the first device end 116 and the second top member end 126 is located at the second device end 118. As will be described below, when the device 100 is moved to the closed position, the top member 102 again overlies the base member 108, but is rotated by approximately 180 degrees such that the touch screen 136 is covered by the base member 108. The movement of the top member 102 with respect to the base member 108 is constrained such that movement of the top member 102 to the closed position follows a pre-defined path.

In order to close the device 100, such that the base member 108 covers the touch screen 136, a user may apply a lifting force to the first top member end 124 (shown in FIG. 1), for example, by applying a lifting force to the flange 138, to initiate movement of the top member 102. Lifting on the first top member end 124 of the top member 102 causes the top member 102 to rotate clockwise about a first rotation axis indicated by dotted line 264 (shown in FIG. 1) which extends through the first pulley 164. The first pulley 164 rotates together with the top member 102. As can be seen, the perimeter or circumference of the first pulley 164 extends around, or about, the first rotation axis 264.

Turning again to FIG. 8, the first half wire section 260 (including the first wire portion Q-R and the second wire portion T-S) actuates the counter-rotation of the linkage 112 for movement of the top member 102 from the opened position to the closed position. In particular, the rotation of the first pulley 164 causes the second wire portion T-S to begin to wrap around the first pulley 164. However, because the first half wire section 260 has a fixed length, and because the linkage 112 maintains a constant distance between the first pulley 164 and the second pulley 166, the first wire portion Q-R must unwrap from the second pulley 166. The fourth wire portion V-W unwraps from the first pulley 164 and the third wire portion Q-X wraps around the second pulley 166. To accommodate above-described pulley action, the linkage 112 rotates counter-clockwise about a second rotation axis indicated by dotted line 266 (shown in FIG. 1) which extends through the second pulley 166. Thus, the rotation of the top member 102 actuates the counter-rotation of the linkage 112. As can be seen, the perimeter or circumference of the second pulley 166 extends around, or about, the second rotation axis 266.

The counter rotation of the linkage 112 causes translational movement of the top member 102 with respect to the base member 108. The first rotation axis 264 follows the translational movement of the top member 102 such that the first rotation axis 264 always passes through the first pulley 164.

There is a mathematical relationship between the relative diameters of the first pulley 164 and the second pulley 166, the rotation of the top member 102, and the counter-rotation of the linkage 112. The top member 102 rotates about 180 degrees when moving between the opened and closed positions. The linkage 112, in this embodiment, counter-rotates about two times the angle $\alpha$ shown in FIG. 7. The following expression describes the relationship between the angle $\alpha$, the diameter of the first pulley (represented by D1 in the equation below) and the diameter of the second pulley (represented as D2 in the equation below):

$$D2 = \left(\frac{(2*\alpha) + 180}{2*\alpha}\right)D1$$

Therefore, the ratio of the second pulley diameter (D2) and the first pulley Diameter (D1) is close to, but slightly greater than, 2:1. As described above, the angle $\alpha$ in this embodiment is approximately 86 degrees, in which case, the diameter of the second pulley 166 is approximately 2.047 times the diameter of the first pulley 164. Thus, in this embodiment, a diameter of the first pulley 164 being approximately 3.5 mm yields a diameter of the second pulley 166 of approximately 7.16 mm. As described above, the angle α, and therefore the diameter ratio, will be different in other embodiments.

As described above, the ratio of slightly more than 2:1 for the pulley diameters may provide proper rotation of the top member 102 and counter-rotation of the linkage 112. If, for example, the ratio was 1:1, the top member 102 would remain parallel to the base member 108, rising away from and back toward the base member 108, and finally landing in a position offset to the left. By adding 180 degrees to the angle of rotation transcribed by the linkage 112 (i.e. 2*α) and dividing the result by the angle of rotation to give the pulley diameter ratio, the mechanism adds the desired 180 degree flip to the top member 102 (as opposed to the simple translation that would otherwise be seen with a 1:1 ratio).

Figure 9:
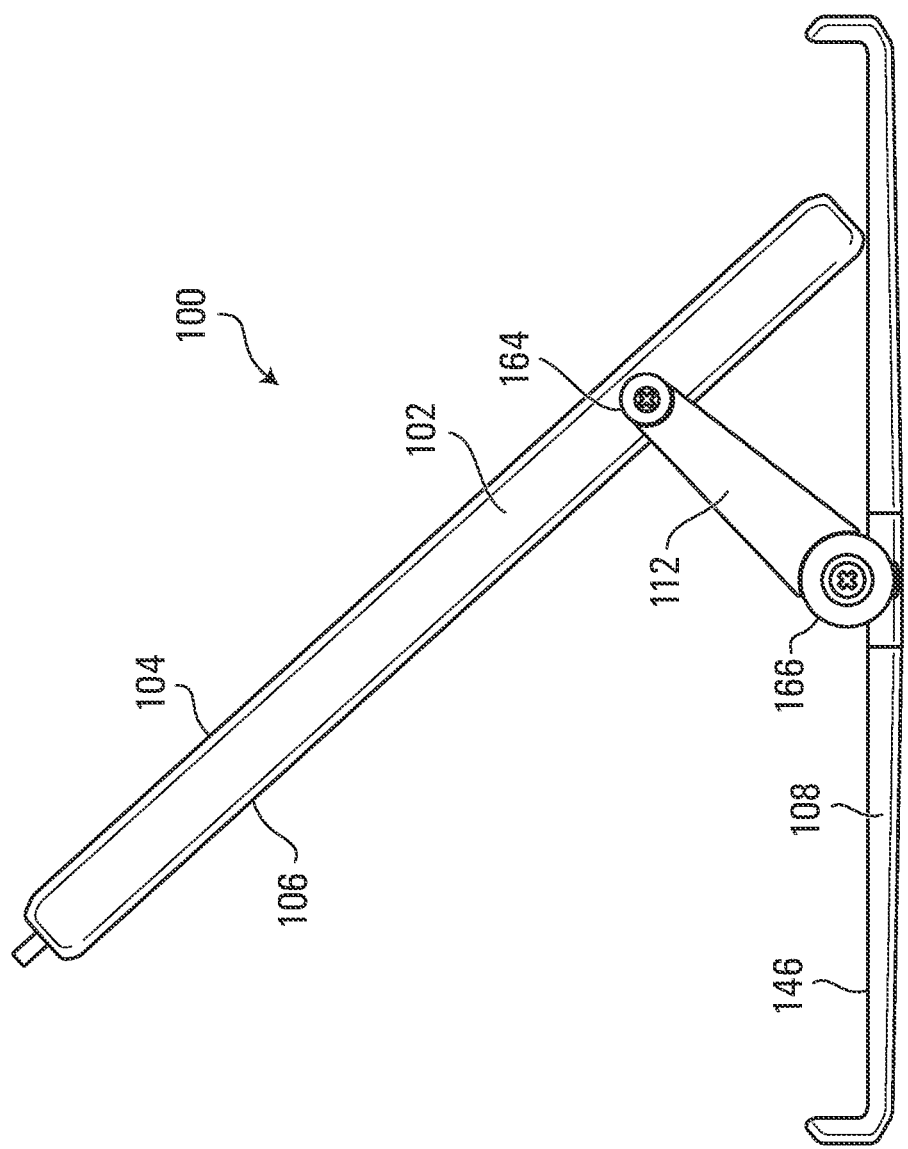
FIG. 9 is a side view of the device of FIG. 1 in a first angled position.

FIG. 9 is a side view of the device 100 in a first angled position, which is intermediate the closed and opened positions. In particular, the top member 102 has been rotated with respect to the base member 108, and the linkage 112 has counter-rotated as governed by the relative sizes of the first pulley 164 and the second pulley 166 described above. Thus, in the first angled position, the top member 102 is at an angle with respect to the base member 108.

It is possible to hold the mechanism in an intermediate position between the closed and opened positions with either a "soft" or "hard" stop so that it may be held at a given angle, enabling other modes of use or operating configurations. A soft stop may be provided by a biasing force that resists rotation of the top member away from an intermediate position between the closed and opened positions. A hard stop may be provided by an actual physical stop that prevents rotation of the top member from an intermediate position. For example, in this embodiment, a soft stop is provided by an attractive force between the top member magnet 137 (shown in FIG. 2) and the linkage magnet 258 (shown in FIG. 5).

Figure 10:
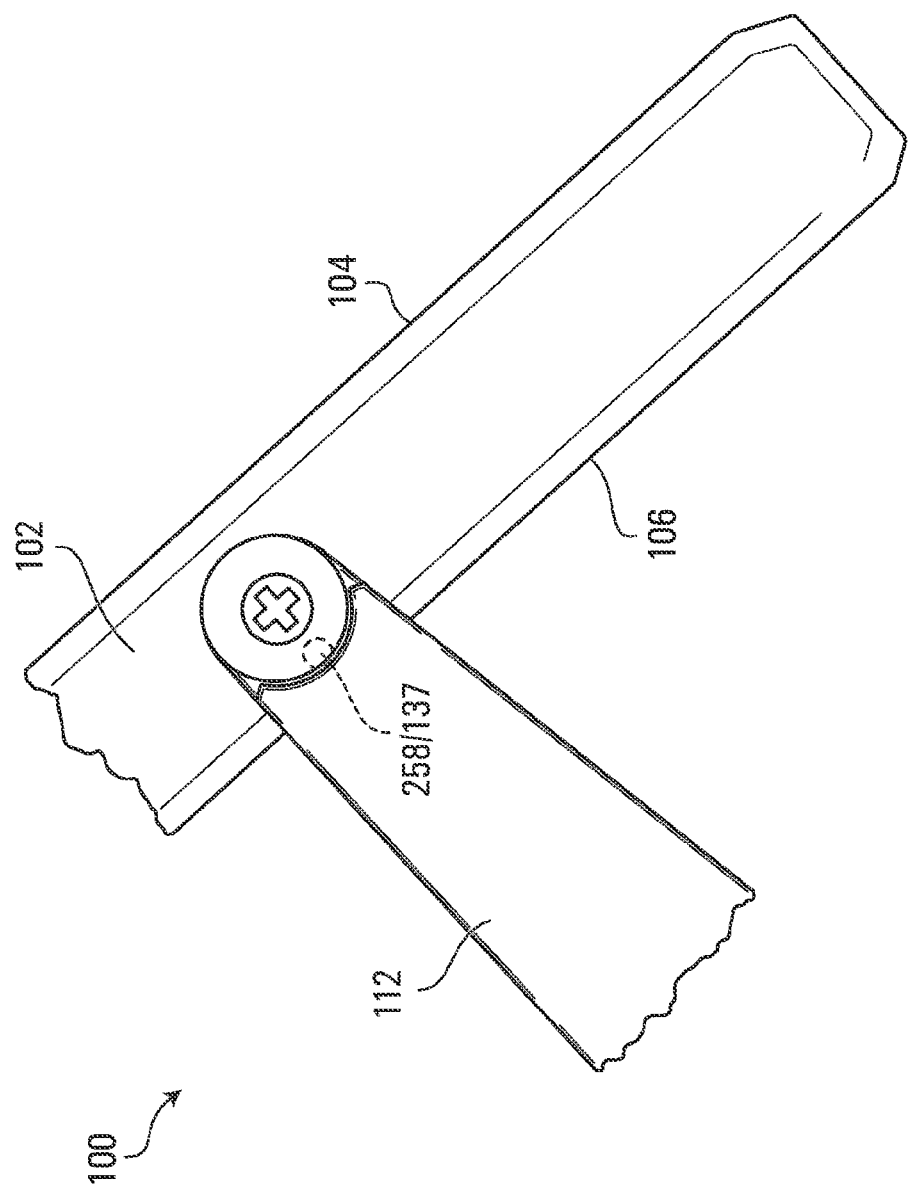
FIG. 10 is an enlarged side view of the device of FIG. 1 in the first angled position.

FIG. 10 is an enlarged side view of the device 100 in the first angled position shown in FIG. 9. FIG. 10 shows the top member magnet 137 and the linkage magnet 258. The top member magnet 137 and the linkage magnet 258 are shown in dotted lines because they are hidden from view by the linkage 112 in FIG. 10. As seen in FIG. 10, the top member magnet 137 and the linkage magnet 258 are aligned when the device 100 is in the first angled position. The top member magnet 137 and the linkage magnet 258 are arranged to provide an attractive force when aligned. In this embodiment, the top member magnet 137 and the linkage magnet 258 are arranged to provide sufficient attractive force to bias the top member 102 from rotating away from the first angled position absent force applied by a user. Thus, the top member magnet 137 and the linkage magnet 258 act as a "soft stop" to provide a stable position (the first angled position in this embodiment) between the opened and closed positions. Thus, the device 100 is provided with a stable position intermediate the opened and closed positions in which the touch screen 136 on the first top member surface 104 is accessible. A user may apply force to overcome the attractive force of the magnets 137, 258 to move the device 100 away from the first angled position shown in FIG. 10.

The top member magnet 137 and the linkage magnet 258 are provided as an example of how a soft stop may be provided. In other embodiments, no stop is provided for establishing a stable intermediate position between closed and opened positions. In other embodiments, a stop to provide one or more stable intermediate positions is provided by any number of suitable methods. For example, the linkage mechanism, in some embodiments, may be adapted to provide increased friction for a portion of the movement between the closed and opened positions to resist the movement of the top member 102. The friction may be sufficient to stabilize the top member 102 in the absence of force applied by the user. In other embodiments, a latch may be used to provide a stop. Various combinations of these methods, as well as any other suitable known methods, may be used. The intermediate stable position is not limited to the particular first angled position shown in FIGS. 9 and 10. The device may be adapted to provide the intermediate position at any desired angle of the top member. For example, magnets may be used in various locations on the linkage mechanism and the top and/or base members to provide one or more intermediate position at any desired angle. Rather than one intermediate position, multiple positions at various and/or continuous angles may be provided.

Figure 11:
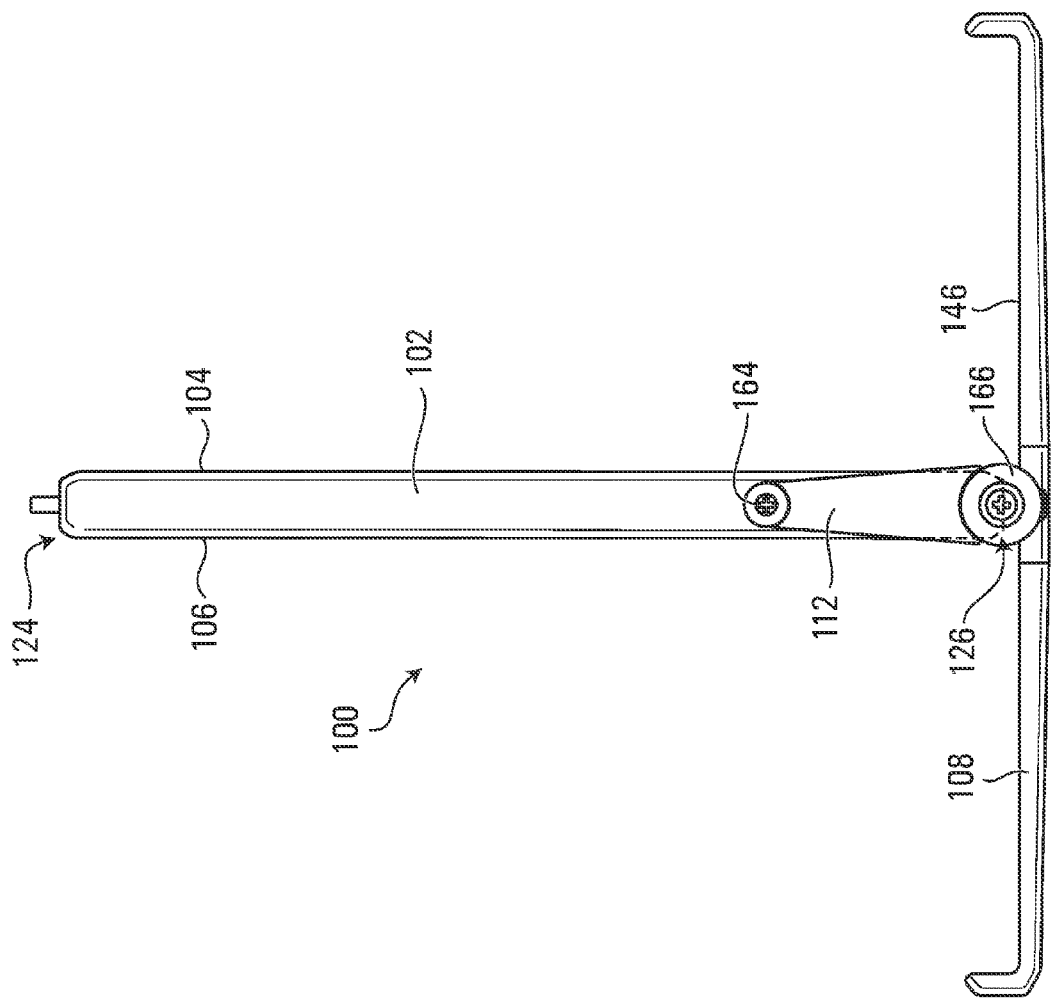
FIG. 11 is a side view of the device of FIG. 1 in an intermediately opened position.

As the device 100 continues to move from the position shown in FIGS. 9 and 10, it will move to the intermediately opened position shown in FIG. 11.

FIG. 11 is a side view of the device 100 in an intermediately opened position. The top member 102 is partially shown in dotted lines to indicate where it is hidden by the linkage 112 and the second pulley 166. As shown in FIG. 11, when the top member 102 has rotated by approximately 90 degrees, the linkage 112 has counter-rotated such that it is approximately perpendicular to the base member 108. The top member 102 is also perpendicular to the base member 108 with the second top member end 126 nearest to the base member 108. As can also be seen in FIG. 11, because the distance between the first pulley 164 (i.e. the first node) and the base member 108 is greater than the distance between the first pulley 164 and the second top member end 126, clearance is provided for the top member 102 as the device 100 is moved between the opened and the closed positions.

Figure 12:
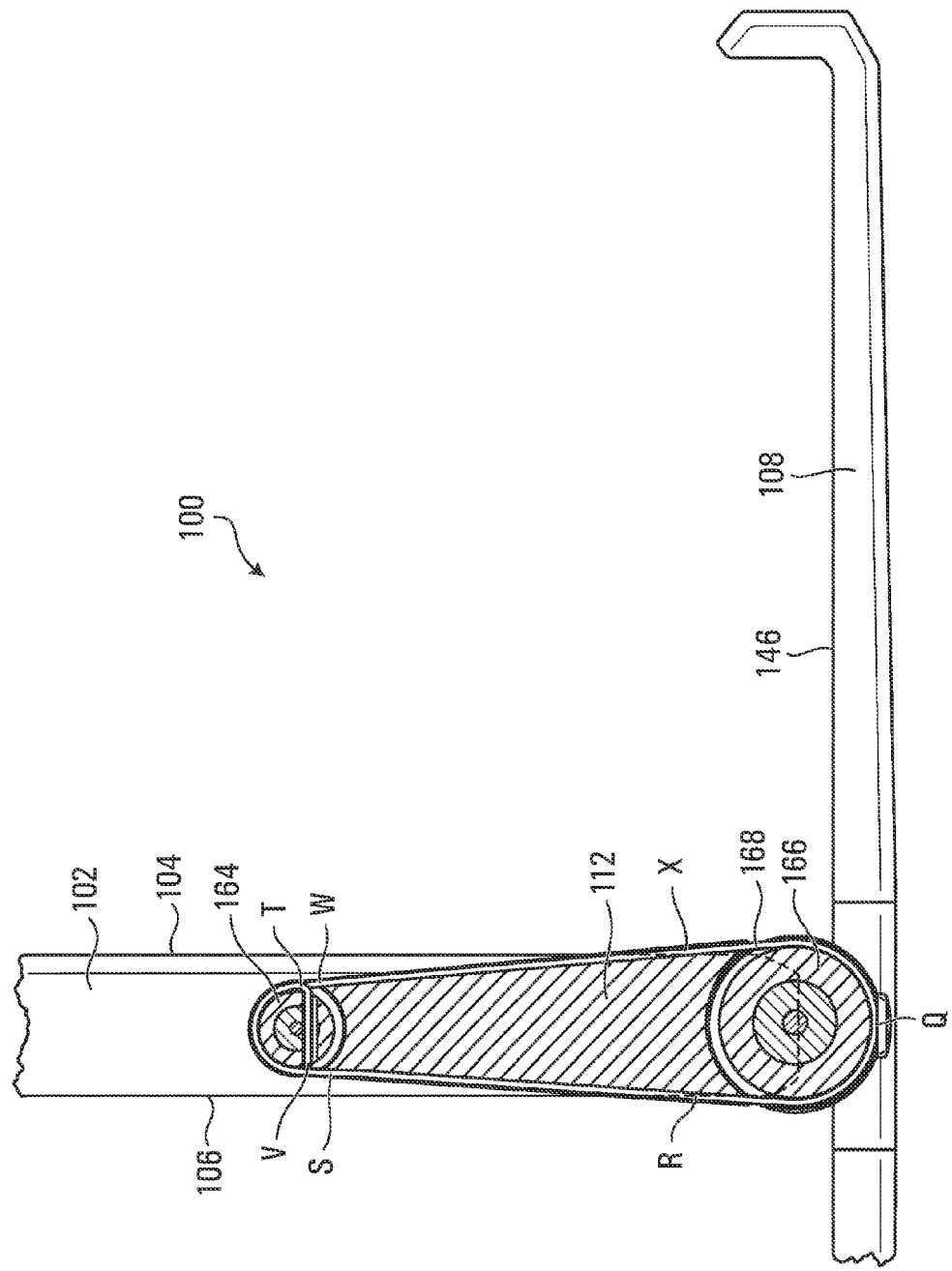
FIG. 12 is a partial enlarged cross-section side view of the device of FIG. 1 in the intermediately opened position, wherein the cross section is in the same plane shown in FIG. 7.

FIG. 12 is a partial enlarged cross-section side view of the device 100 in the intermediately opened position of FIG. 11. The cross section in FIG. 12 is in the same plane shown in FIG. 7. However, the device 100 is in the intermediately opened position rather than the opened position. The top member 102 is partially shown in dotted lines to indicate where it is hidden by the linkage 112 and the second pulley 166. The cross-section view of FIG. 12 allows the tension wire 168 to be seen. The first half wire section 260 (including the first wire portion Q-R and the second wire portion T-S) is partially wrapped around each of the second pulley 166 and the first pulley 164. The second half wire section 262 (including the third wire portion Q-X and the fourth wire portion V-W) is also partially wrapped around each of the second pulley 166 and the first pulley 164. As the device 100 continues to move from the position shown in FIGS. 11 and 12, it will move to the second angled position shown in FIG. 13.

Figure 13:
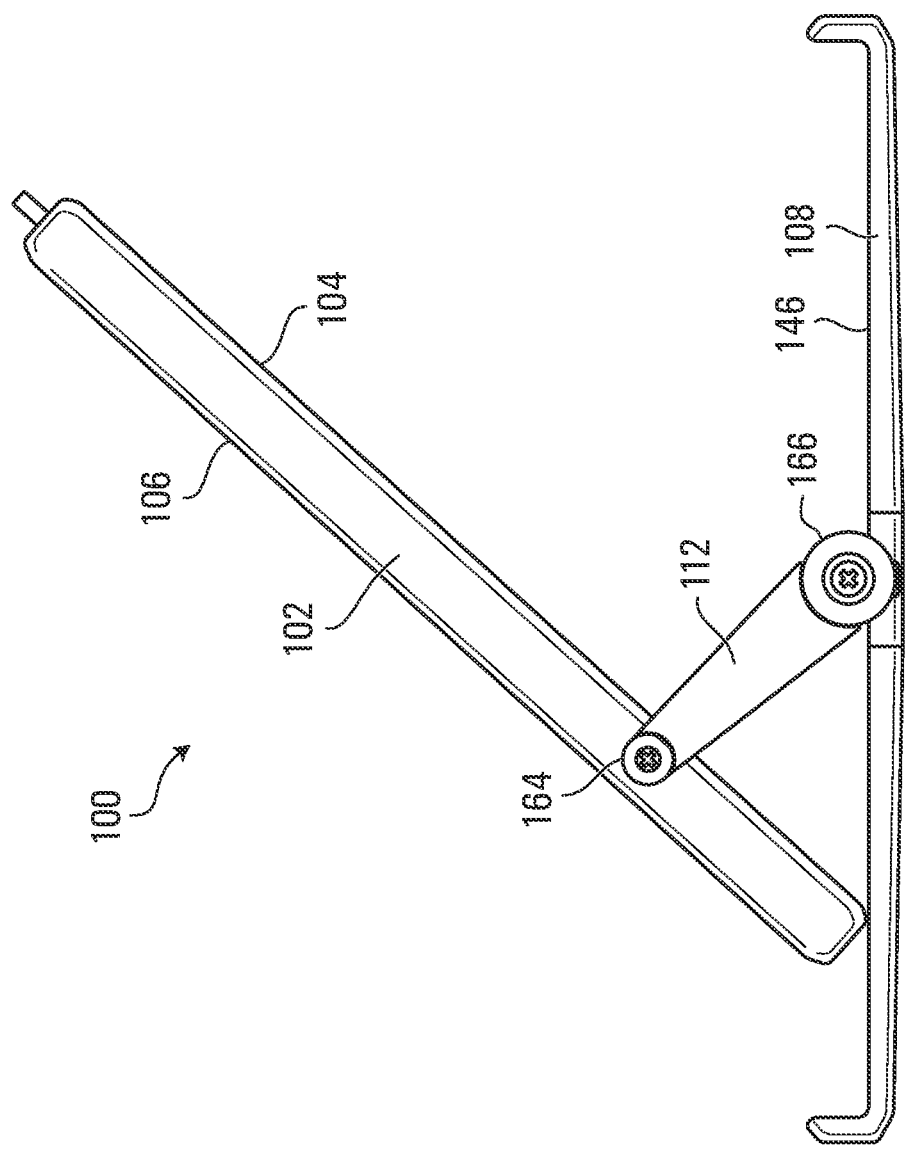
FIG. 13 is a side view of the device of FIG. 1 in a second angled position.
Figure 14:
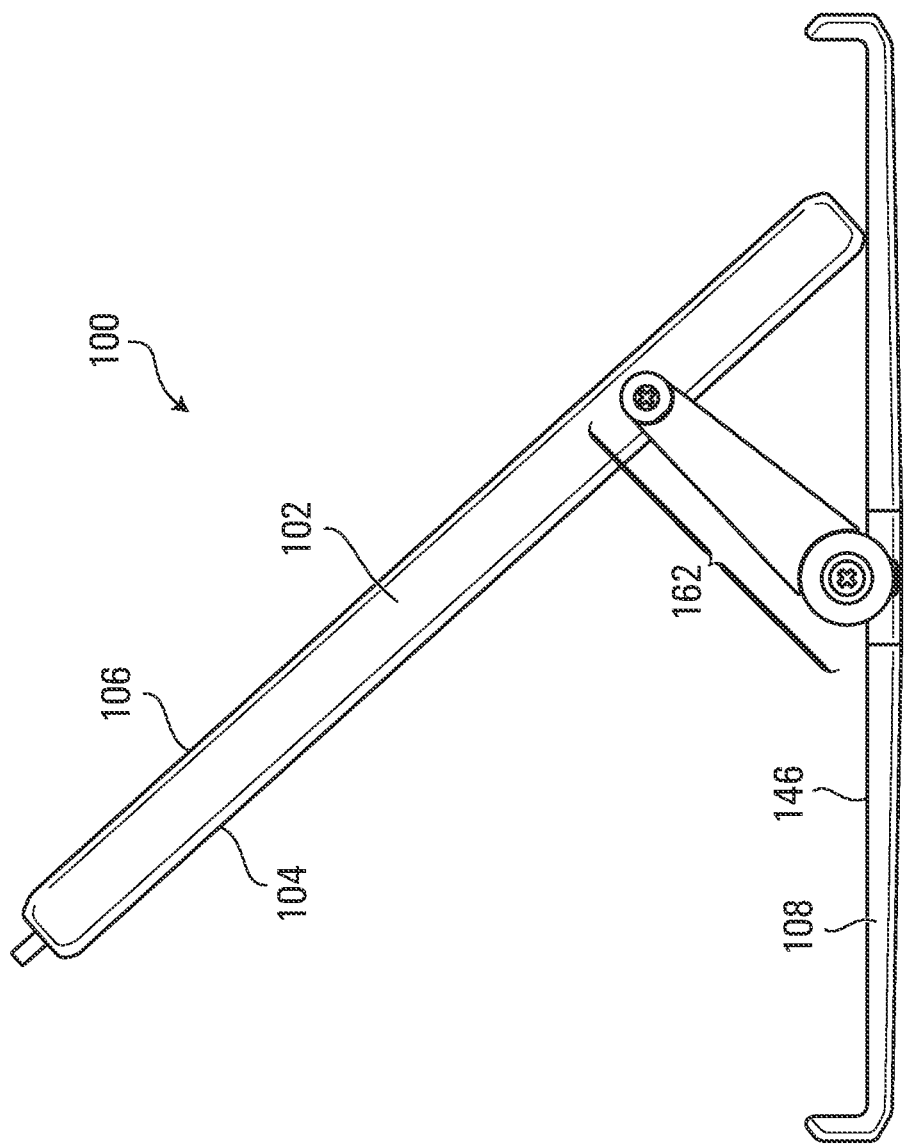
FIG. 14 is a reverse side view of the device of FIG. 1 in the second angled position.

FIG. 13 is a side view of the device 100 in a second angled position, which is intermediate the closed and opened positions. In particular, the top member 102 has been further rotated with respect to the base member 108, and the linkage 112 has counter-rotated by an amount governed by the relative sizes of the first pulley 164 and the second pulley 166 described above. FIG. 14 is a reverse side view of the device 100 in the second angled position. FIG. 14 shows the lid member 102, the base member 108 and the second linkage mechanism 162. As the device 100 continues to move from the position shown in FIGS. 13 and 14, it will move to the closed position shown in FIGS. 15 and 16.

FIG. 15 is a perspective view of the device 100 in the closed position. In particular, the top member 102 has been rotated approximately 180 degrees from the opened position so that the second top member end 126 is located at the first device end 116 and the first top member end 124 is located at the second device end 118. As shown in FIG. 15, the top member 102 again overlies the base member 108, but the first top member surface 104, including the touchscreen 136 (shown in FIG. 1), is covered and protected by the base member. The linkage 112 has also rotated with respect to the base member 108 by two times the angle α, which equals less than (but close to) 180 degrees. Because the second pulley 166 (i.e. the second node) is attached to the base member 108 centrally between the first base member end 157 and the second base member end 158, the position of the linkage mechanism 110 with respect to the base member 108, in the closed position, is a mirror image of the position of the linkage mechanism 110 in the opened position. This relationship, coupled with the 180 degree rotation of the top member 102 results in the top member 102 being in the same lateral position (aligned with the base member 108) as in the opened position, only rotated by 180 degrees.

FIG. 16 is a partial enlarged cross-section side view of the device 100 in the closed position. The cross-section in FIG. 16 is in the same plane shown in FIG. 7. However, the device is in the closed position rather than the opened position. In FIG. 16, a portion of each of the first pulley 164 and the second pulley 166 is cut away, parallel with the first pulley outer face 179 (shown in FIG. 4) and the second pulley outer face 202 (shown in FIG. 3), so that the tension wire 168 can be seen. As seen in FIG. 16, in the closed position, the first half wire section 260 (including the first wire portion Q-R and the second wire portion T-S) is partially wrapped around the first pulley 164 and substantially unwrapped from (but is still in tangential contact with) the second pulley 166. In particular, the first wire portion Q-R has substantially unwrapped from the second pulley 166 and the second wire portion T-S has wrapped around the first pulley 164. Conversely, the half second wire section 262 (including the third wire portion Q-X and the fourth wire portion V-W) is partially wrapped around the second pulley 166 and substantially unwrapped from (but in tangential contact with) the first pulley 164. In particular, the third wire portion Q-X has wrapped around the second pulley 166 and the fourth wire portion V-W has substantially unwrapped from the first pulley 164. The points S and V are shown with dotted lines to indicate that they are hidden by overlapping of the tension wire 168.

As described above, the arrangement of the pulley system in this embodiment may ensure that, whenever the device 100 is opened or closed, the top member always transcribes the same pre-defined translational and rotational path when moving between the opened and closed positions. By controlling and constraining the motion of the top member in this manner, a user may be able to more easily open the device because the cover cannot freely move with respect to the top member 102. Rather, less controlled force, dexterity and/or concentration may be required by the user to open and close the device.

The linkage mechanism 110 shown in FIG. 1 and described above provides that the top member 102 rotates within the width of the base member 108. Specifically, at no point of the movement of the top member 102 does the top member 102 overhang either the first base member end 142 or the second base member end 143. This may provide the benefit that the device is more comfortable to open in locations where personal space is limited. However, in other embodiments, the lateral movement of the top member is not restricted in this manner and the top member may overhang an end or side of the base member during movement between the opened and closed positions.

In order to move the device 100 from the closed position shown in FIGS. 15 and 16 back to the opened position shown in FIGS. 1 and 4, the movements described previously simply need to be reversed. The movement from the closed to the opened position will similarly be constrained such that the top member 102 follows the same pre-defined path, but in reverse. When opening or closing the device, the user may use one hand to hold the base member 108 and another hand to rotate (or "flip") the top member 102. Essentially, the movement of the linkage mechanism 110 will mirror the movement described with reference to FIGS. 1 and 9 to 16, except that the second half wire section 262 (including the third wire portion Q-X and the fourth wire portion V-W) will actuate the counter-rotation of the linkage for movement of the top member from the closed position to the opened position.

The movement of the device 100 described above has been described from the perspective of a user applying force to the top member 102 to move the top member 102 between the opened and closed positions. In this described movement, the motion constraint mechanism 114 (shown in FIG. 1) transfers the rotation of the top member 102 to a counter-rotation of the linkage 112. However, the motion constraint mechanism 114 (shown in FIG. 1) will also transfer counter-rotation of the linkage 112 to rotation of the top member 102. Thus, force may be applied to the linkage 112, rather than the top member 102, in order to move the device 100 between the opened and closed positions, and the top member 102 may follow the same pre-defined path. In some embodiments, the device may be provided with a mechanism that the user can push or pull to apply force to the linkage for this purpose. Alternatively, the user may apply force directly to the linkage in some embodiments. By way of example, the linkage may have a torsion force applied via a motor, a push button that perhaps drives a rack that, in turn, drives the base gear. One skilled in the art will appreciate that force could be applied by various means. The force applied to the linkage may make the top member of the device open and/or close without being touched directly.

Embodiments are not limited to those in which two nodes are fixed to the top and base members respectively. For example, as described above, a rack and pinion system with two racks attached to the base member may be used. Each rack could be rotatably coupled to the base member at a respective point, and a pinion fixed to the top member could rotate along the racks. This type of arrangement would include three nodes (the two points the racks are attached to the base member being two nodes, and the pinion being a third node) wherein the distance between the node on the top member (the pinion) and the nodes on the base member (the racks) is not constant. As also described herein, other types of systems and arrangements are also possible.

As mentioned above, in systems employing pulleys, the diameters and/or shapes of the pulleys may vary and are not limited to the particular arrangement shown in FIGS. 1 to 16. For example, elliptical or oval shaped pulleys may be used such that the perimeters of the pulleys are non-circular. Such non-circular pulleys may allow the pulleys to be smaller in one dimension (for example, the height of the pulleys in the opened and closed positions) than a circular pulley while maintaining the same total perimeter. Also, using non-circular pulleys may allow the rate of rotation of the top member and the linkage to be varied throughout the movement between opened and closed positions. Similar variations may also be applied to non-pulley embodiments (such as gears and sprockets).

Figure 17:
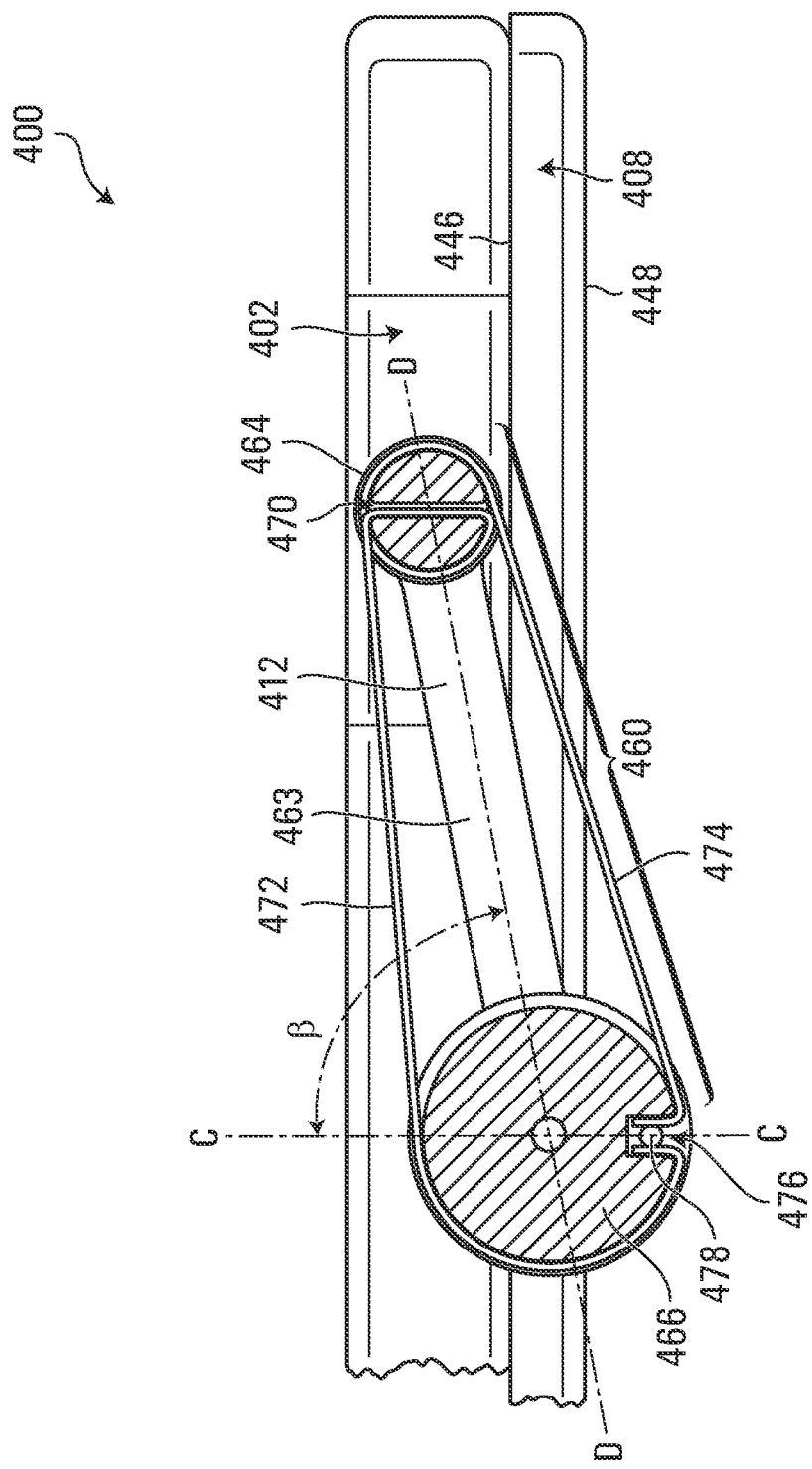
FIG. 17 is a side view of a mobile electronic device according to another embodiment in an opened position.

FIG. 17 shows an example of another embodiment according to the disclosure in which larger pulleys than those described above are used. The device 400 is shown in an opened position and includes a top member 402 and a base member 408. The device 400 includes a linkage mechanism 460. The top member 402, the base member 408 and the linkage mechanism 460 are all functionally similar to the device 100 (shown in FIGS. 1 to 10). The linkage mechanism 460 includes a linkage 463, a first pulley 464 and a second pulley 466. The linkage 463 shown in FIG. 17 does not include a wire guard, but is a more simple linkage between the first pulley 464 and the second pulley 466.

The movement of the device 400 between opened and closed positions is similar to the movement of the device 100 shown in FIGS. 1 to 10.

The base member 408 has a first surface 446 and an opposite second surface 448. FIG. 17 shows a plane, indicated by the line C-C, which is perpendicular to the first surface 446 and the second surface 448. A line D-D indicates an axis which travels lengthwise along the linkage 412. The angle β shown between lines C-C and D-D in FIG. 17 indicates half of the angular rotation of the linkage 412 during movement of the device between the closed and opened positions. In this embodiment, the angle β is approximately 79 degrees. The first pulley in this embodiment has a diameter of approximately 7 mm. Thus, following the mathematical relationship described above with respect to the device 100 shown in FIGS. 1 to 16 (except using the angle β rather than α), the diameter of the second pulley 466 is 14.97 mm. Various other pulley sizes, ratios, and angles of rotation may be used in other embodiments.

The device 400 also illustrates an embodiment in which two separate wires couple the top pulley 464 to the base pulley 466. In particular, the first pulley 464 has a first wire hole 470 similar to the wire hole 190 of the first pulley 164 shown in FIG. 7. However the first wire hole 470 is not offset in the first pulley 464. Each of a first wire 472 and a second wire 474 are coupled to the first pulley 464 in the first wire hole 470. The second pulley 466 includes a second wire hole 476 and anchor screw 478 for anchoring the first wire 472 and the second wire 474 to the second pulley 466. The arrangement of the first wire 472 and the second wire 474 is similar to the arrangement of the first half wire section 260 and the second half wire section 262 of the tension wire 168 for the device 100 shown in FIGS. 1 to 16. The ratio of the movement of the device 400 from the opened position to the closed position and vice versa is also similar to the device 100 shown in FIGS. 1 to 16.

As shown in the figures and described above, embodiments are not limited to particular pulley diameters. However, increasing the size of the first pulley and the second pulley may reduce the stress placed on the line (e.g. tension wire) coupling the pulleys during movement between the closed and opened positions and may thereby reduce the pre-tension required to be maintained in the linkage mechanism (i.e. the tension maintained in the line even when the device is not being moved between the closed and opened positions).

As described above, the linkage mechanism in some embodiments includes a pulley system. In other embodiments, the motion constraint mechanism includes a system that does not include pulleys. Another example embodiment which includes gears rather than pulleys as part of a motion constraint mechanism in a linkage mechanism will now be described with reference to FIGS. 18 to 24.

Figure 18:
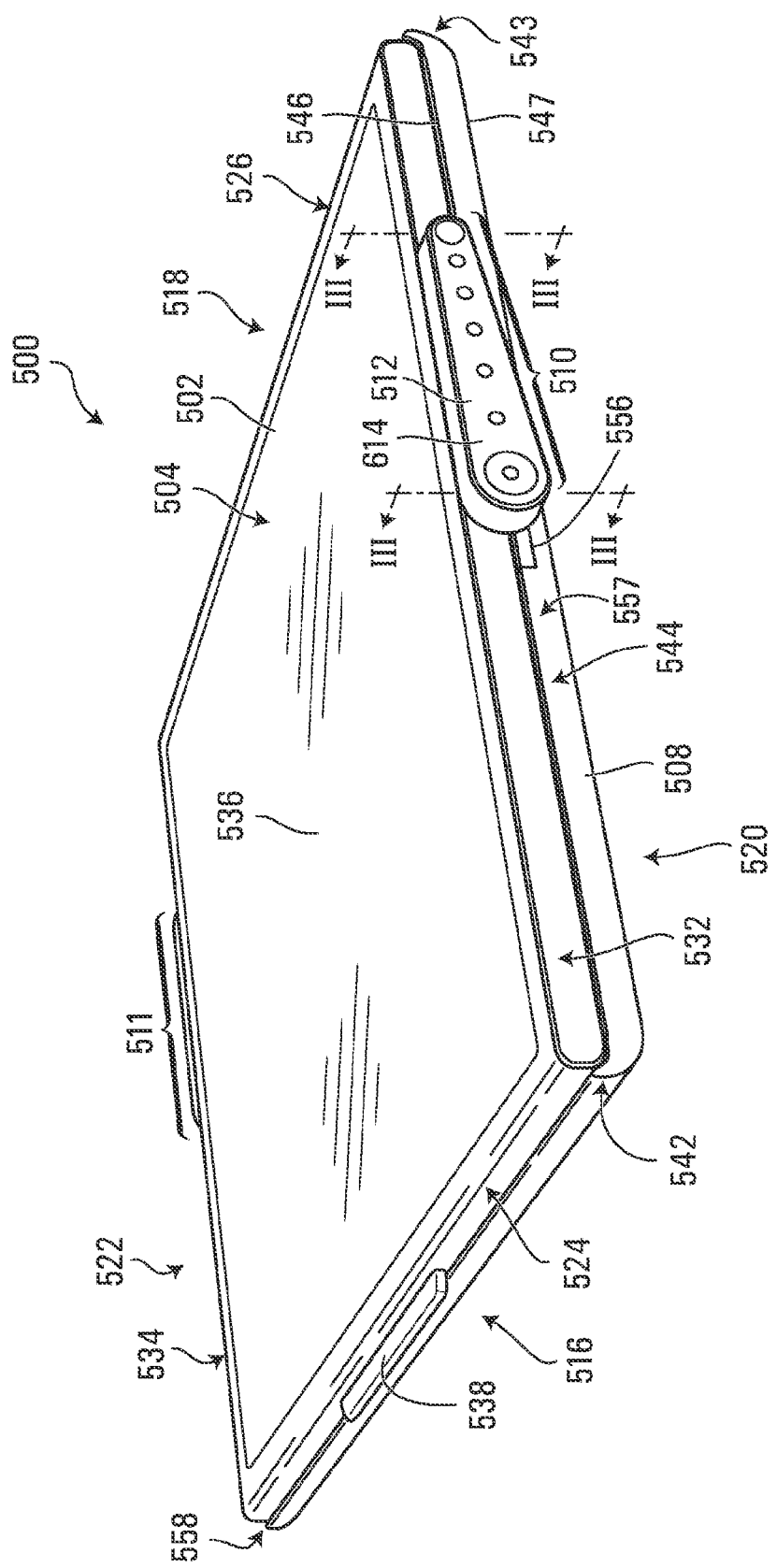
FIG. 18 is a top perspective view of a mobile electronic device according to another embodiment in an opened position.

FIG. 18 is a perspective view of a device 500 according to another embodiment of the disclosure in which a gear system is employed. The device 500 described herein is provided as another example embodiment. The device 500 is shown in a first position in FIG. 18. The device 500 can be moved to a second position, as will be discussed below. The first and second positions of the device 500 may be referred to as opened and closed positions.

The device 500 includes a top member 502 having a first top member surface 504 and a second top member surface 506 (shown in FIGS. 21 to 24) opposite to the first top member surface 504. The device 500 also includes a base member 508. The device 500 further includes at least one linkage mechanism 510, 511 coupling the top member 502 and the base member 508 such that device 500 may be moved between the opened position and the closed positions. The linkage mechanism 510 includes a gear housing 512 which acts as a linkage intermediate the top member 502 and the base member 508. In this embodiment, the linkage has a fixed length, although, as described above, linkages in other embodiments may not have a fixed length. The at least one linkage mechanism 510, 511 also includes a motion constraint mechanism 514 (shown in FIG. 19) that constrains movement of the top member 502 with respect to the base member 508 between the opened and closed positions to a pre-defined rotational and translational path, the rotational and translational path being defined by rotation of the top member 502 with respect to the base member 508 and counter-rotation of the linkage 512 with respect to the base member 508. When the device 500 is in the opened position, the top member 502 overlies the base member 508 with the second top member surface 506 facing toward the base member 508 (i.e. the second top member surface 506 is covered by the base member 508). The first top member surface 504 is accessible and faces away from the base member 508. When the device 500 is in the closed position, the top member 502 overlies the base member 508 with the first top member surface 504 facing toward the base member 508 (i.e. the first top member surface 504 is covered by the base member 508). The second top member surface 506 is accessible and faces away from the base member 508.

The at least one linkage mechanism in this embodiment 510 includes a first linkage mechanism 510 and a second mirrored linkage mechanism 511. The at least one linkage mechanism 510, 511 described herein provides a controlled movement of the device wherein the movement of the top member 502 is constrained such that the top member 502 transcribes the same translational and rotational path throughout the entire movement between the opened position and the closed position. The motion constraint mechanism 514 (shown in FIG. 19) transfers the rotation of the top member 502 to the counter-rotation of the linkage 512. The motion constraint mechanism 514 also transfers the counter-rotation of the linkage 512 to the rotation of the top member 502. Thus, the motion control mechanism couples the rotation of the top member 502 with the counter-rotation of the linkage 512.

The result of this rotational coupling is that, for any point of the rotation of the top member 502 with respect to the base member, the translational position of the top member 502 is defined and vice versa. Thus, the top member 502 follows a unique, pre-determined or pre-defined rotational and translational path for movement between the closed and opened positions. This pre-defined path is described in more detail below. In this embodiment, the pre-defined path of the top member includes approximately 180 degrees of rotation with respect to the base member with the top member being in approximately the same lateral position in both the opened position and the closed positions. The path may vary in other embodiments. For example, the rotation of the top member, and/or its relative positioning in the opened and closed positions may be different.

The device 500 has a first device end 516, an opposite second device end 518, a first device side 520 and an opposite second device side 522. The distance from the first device end 516 to the second device end 518 is referred to herein as a length of the device. The distance from the first device side 520 to the second device side 522 is referred to herein as a width of the device.

The direction extending from the first device end 516 to the second device end 518 is referred to herein as the forward direction and the opposite direction is referred to herein as the backward direction. The direction extending perpendicularly away from the base member 508 toward the top member 502 is referred to herein as the upward direction and the opposite direction is referred to herein as the downward direction. An orientation in the upward and/or downward direction may be referred to as vertical. These reference directions are for ease of description and do not restrict the orientation of the elements of the device 500 including the top member 502 and the base member 508 during use.

The top member 502 and the base member 508 of the device 500 shown in FIG. 18 are similar in form and function to the top member 102 and base member 108 of the device 100 shown in FIG. 1. In this embodiment, the first top member surface 504 includes a touchscreen 536 that covers most of the first top member surface 504.

In some embodiments, the top member includes a means to provide an accessible location for a finger to grip the top member 502 in order to move the device from either the opened position or the closed position. For example, the embodiment shown in FIG. 18 includes a flange protrusion 538 that extends from the first top member end 524.

The base member 508 in this embodiment is a protective cover. The base member 508 includes a substantially flat cover 544 that is shaped to cover one of the first top member surface 504 and the second top member surface 506 (shown in FIG. 21) of the top member 502 depending on whether the device is in the opened position or the closed position. The cover 544 has a first cover face 546 (shown in FIGS. 21 to 24) and an opposite second cover face (not shown). The base member has a first base member end 542 and an opposite second base member end 543. The first base member end 542 and the second base member end 543 in this embodiment are curved upward slightly from the flat cover 544 and only partially cover the first top member end 524 and the second top member end 526. As described above, other embodiments provide different shapes for the top and base members.

The base member 508 has a first base member side 557 and a second base member side 558 opposite to the first base member side 557. The base member 508, in this embodiment, includes a generally rectangular shaped pulley attachment recess 556 in the first cover face 546 at the first base member side 557. The pulley attachment recess 556 is located centrally along first base member side 557 and has a depth less than the thickness of the base member 557. A corresponding and mirrored recess (not shown) is at the second base member side 558.

As described above, in some embodiments, a "soft stop" or a "hard stop" may be implemented in order to provide one or more stable positions between the opened and closed positions. In this embodiment, the base member 508 includes a peg 550, that is retractable or reclinable, and a peg recess 552 (both shown in FIGS. 21 to 24). The peg recess 552 is shown in dotted lines to indicate that it is hidden from view by the first base member side 557. The peg 550 is similarly shown in dotted lines in FIGS. 21, 23 and 24 for the same reason. In this embodiment, the peg 550 is located approximately where the second top member end 526 will be positioned over the base member 508 when the device is in the first angled position shown in FIG. 22. The peg 550 is centrally located between the first base member side 557 and the second base member side 558. The peg 550 is adapted to be rotated between a reclined position, wherein the peg 550 lies flat in the peg recess 552, and an upright position where the peg 550 is upright and protrudes substantially vertically out of the peg recess 552. For example, the peg 550 in this embodiment is hingeably attached in the peg recess 552 to allow the rotation between the reclined position and the upright position. The peg 550 rotates toward the second base member end 543 when moving to the upright position. The peg 550 may be located anywhere between the base member side 557 and the second base member side 558 so long as the peg 550, when upright, blocks the path of the second top member end 526 in at least one direction so that the top member 502 can remain in a desired intermediate position. In this embodiment, the peg 550 is positioned to prevent movement of the top member 502 away from the first angled position shown in FIG. 22. Specifically, the peg 550 prevents the top member 502 from falling back to the opened position shown in FIG. 21.

In the embodiment shown in FIG. 18, the first top member end 524 and the second top member end 526 are rounded, although other configurations are possible.

The first linkage mechanism 510 shown in FIG. 18 is located on the first device side 520. The second linkage mechanism 511 mirrors the linkage mechanism 510 and is located on the second device side 522 opposite to the linkage mechanism 510. The first linkage mechanism 510 is essentially the same as the second linkage mechanism 511 in form and function with the exception that the first linkage mechanism 510 and the second linkage mechanism 511 are mirrored with respect to each other. For simplicity, only the first linkage mechanism 510 will be described in detail herein. In other embodiments, only one of the first linkage mechanism 510 and the second linkage mechanism 511 described herein is present. The mirrored pair of linkage mechanisms including the linkage mechanism 510 and the second linkage mechanism 511 are shown by way of example, and other embodiments employ different mechanisms. In other embodiments, one of the linkage mechanisms may be a simple link rotatably coupled to the top and base members or any other suitable linkage mechanism to allow the necessary movement of the top member.

Figure 19:
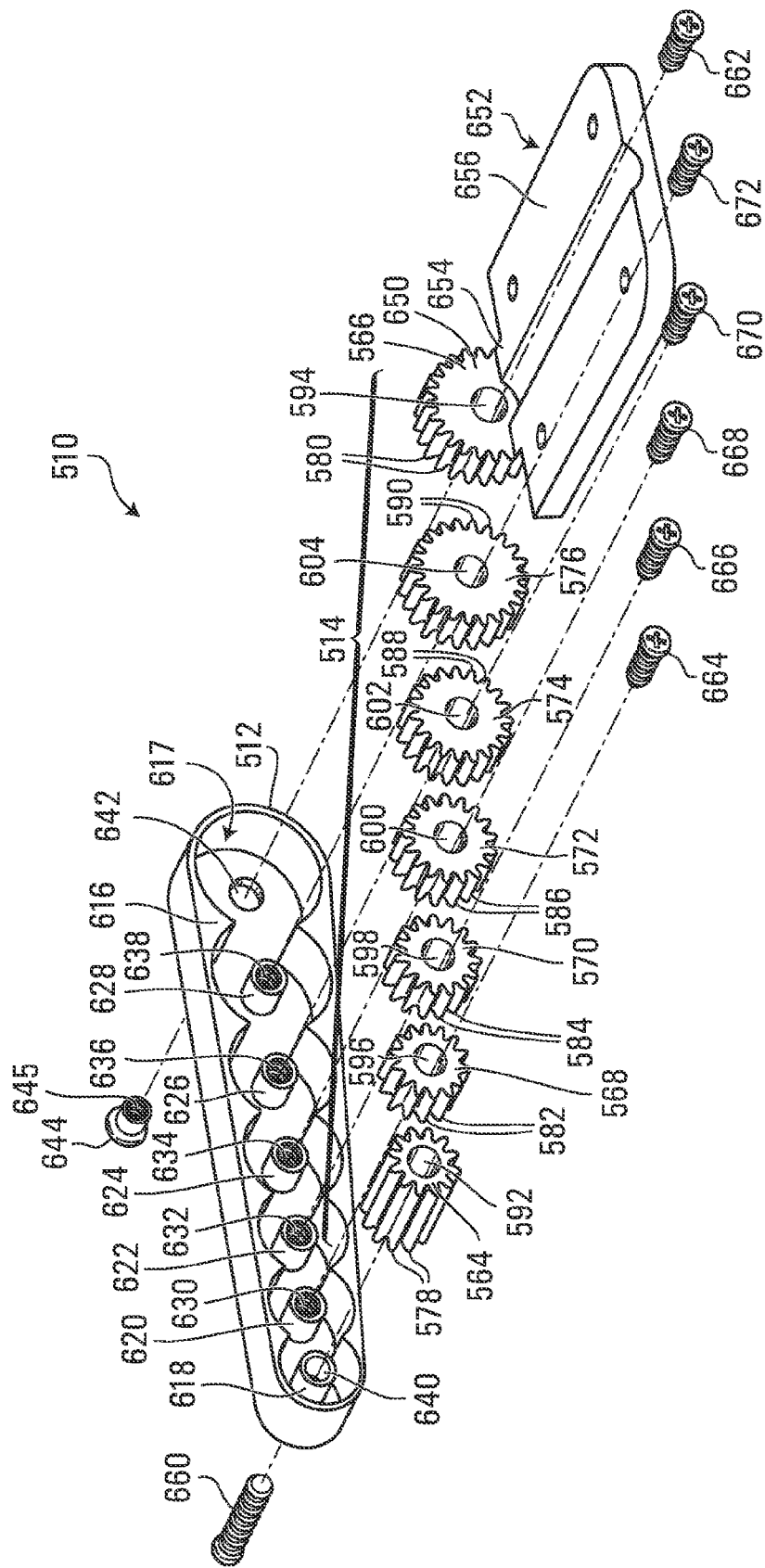
FIG. 19 is an exploded perspective view of a linkage mechanism of the device of FIG. 18.

The first linkage mechanism 510 will now be explained in more detail with respect to FIGS. 19 to 21. FIG. 19 is an exploded reverse perspective view of the first linkage mechanism 510. The first linkage mechanism 510 includes the gear housing 512 and the rotational constraint mechanism 514. FIG. 19 also shows a top screw 660, a base screw 662, and first, second, third fourth and fifth intermediate screws 664, 666, 668, 670, 672.

In some embodiments, the rotational constraint mechanism includes a gear system. For example, the rotational constraint mechanism 514, in this embodiment, includes a first or top gear 564, a second or base gear 566, and at least one gear meshed intermediate the top gear 564 and the base gear 566. More specifically, in this embodiment, the at least one gear includes a first intermediate gear 568, a second intermediate gear 570, a third intermediate gear 572, a fourth intermediate gear 574 and a fifth intermediate gear 576. As will be described below, the top gear 564 forms a first node fixed to the top member 502 (shown in FIG. 18), the base gear 566 forms a second node fixed to the base member 508 (shown in FIG. 18), and the first, second, third, fourth and fifth intermediate gears 568, 570, 572, 574 and 576 form a rotation transfer mechanism connecting to the first node and the second node that is adapted to transfer rotation between the first node and the second node, similar to the device 100 described with reference to FIGS. 1 to 16.

Several details of the linkage mechanism 510 described above relating to how the elements of the linkage mechanism 510 are connected and assembled are described below. Such details are provided as examples only. For example, details of the gear housing 512 and the top gear 564, the base gear 566, and the first, second, third, fourth and fifth intermediate gears 568, 570, 572, 574 and 576 are specific to this implementation. The size, teeth, and methods of attaching and meshing gears intermediate the top and base members may vary.

The top gear 564 has top gear teeth 578. The base gear 566 has base gear teeth 580. The first, second, third, fourth and fifth intermediate gears 568, 570, 572, 574 and 576 have first, second, third, fourth and fifth intermediate gear teeth 582, 584, 586, 588 and 590 respectively. In this embodiment, the base gear teeth 580 do not extend around the entire circumference of the base gear 566 (shown in FIG. 21).

The top gear 564 has a top gear pivot hole 592. The base gear 566 has a base gear pivot hole 594. The first, second, third, fourth and fifth intermediate gears 568, 570, 572, 574 and 576 have first, second, third, fourth and fifth intermediate gear pivot holes 596, 598, 600, 602 and 604 respectively. Each of the pivot holes 592, 594, 596, 598, 600, 602 and 604 is centrally located in the respective gear 564, 566, 568, 570, 572, 574 and 576.

In this embodiment, the diameter of the base gear 566 is slightly more than two times the diameter of the top gear 564. The mathematical relationship between the diameters of the top gear 564 and the base gear 566 is similar to the device 100 described with reference to FIGS. 1 to 16.

The gear housing 512, in this embodiment, does not flex or bend. The gear housing 512 has an outer side 614 (shown in FIG. 18) and an inner side 616. The gear housing 512 includes a housing recess 617 in the inner side 616 that is shaped to receive and allow rotation of each of the top gear 564, the base gear 566 and the first, second, third, fourth and fifth intermediate gears 568, 570, 572, 574, 576 within the gear housing 512 with the gears 564, 566, 568, 570, 572, 574 and 576 being meshed together. The gear housing 512 further includes a top gear pin 618, a first intermediate gear pin 620, a second intermediate gear pin 622, a third intermediate gear pin 624, a fourth intermediate gear pin 626 and a fifth intermediate gear pin 628 within the housing recess 617. The top gear pin 618 and the first, second, third, fourth and fifth intermediate gear pins 620, 622, 624, 626, 628 are shaped to be rotatably received in the corresponding top gear pivot hole 592 and first, second, third, fourth and fifth intermediate gear pivot holes 596, 598, 600, 602 and 604 respectively.

In this particular embodiment, the first, second, third, fourth and fifth intermediate gear pins 620, 622, 624, 626, 628 have first, second, third, fourth and fifth threaded holes 630, 632, 634, 636 and 638 respectively along their length to receive the first, second, third fourth and fifth intermediate screws 664, 666, 668, 670, 672 respectively from the inner side 616 of the gear housing 512. The top gear pin 618 has a non-threaded hole 640 shaped to receive the top screw 660 from the outer side 614 (shown in FIG. 18) of the gear housing 512. Finally, the gear housing 512 includes a housing hole 642 located in the housing recess 617. A stepped bush 644 is also shown in FIG. 19. The housing hole 642 and the base gear pivot hole 594 are adapted to receive the stepped bush 644 (also shown in FIG. 19) from the outer side 614 of the housing. The stepped bush 644 includes a bush threaded hole 645 adapted to receive the base screw 662.

In this embodiment, each of the base gear 566 and the first, second, third, fourth and fifth intermediate gears 568, 570, 572, 574, 576 have a thickness that is less than the depth of the housing recess 617. However, the top gear 564 has a thickness that is greater than the depth of the housing recess 617.

The base gear 564 has an inner base gear face 650 and an opposite outer base gear face (not shown).

The base gear 566 may be fixed to the base member 508 (shown in FIG. 18) in various ways. In this embodiment, the first linkage mechanism 510 includes a pulley attachment member 652. The base gear 566 is parallel to the first device side 520 (shown in FIG. 18). The base gear 566 is formed integral to and extends upwardly from the pulley attachment member 652. In particular, the pulley attachment member 652 includes a narrow section 654, which extends away from the inner base gear face 650. The narrow section 654 is shaped to provide clearance for the gear housing 512. The pulley attachment member 652 also includes wide section 656 extending from the narrow section in a direction away from the base gear 566. The wide section 656 is generally rectangular shaped and is shaped to fit in the pulley attachment recess 556 (shown in FIG. 18).

Figure 20:
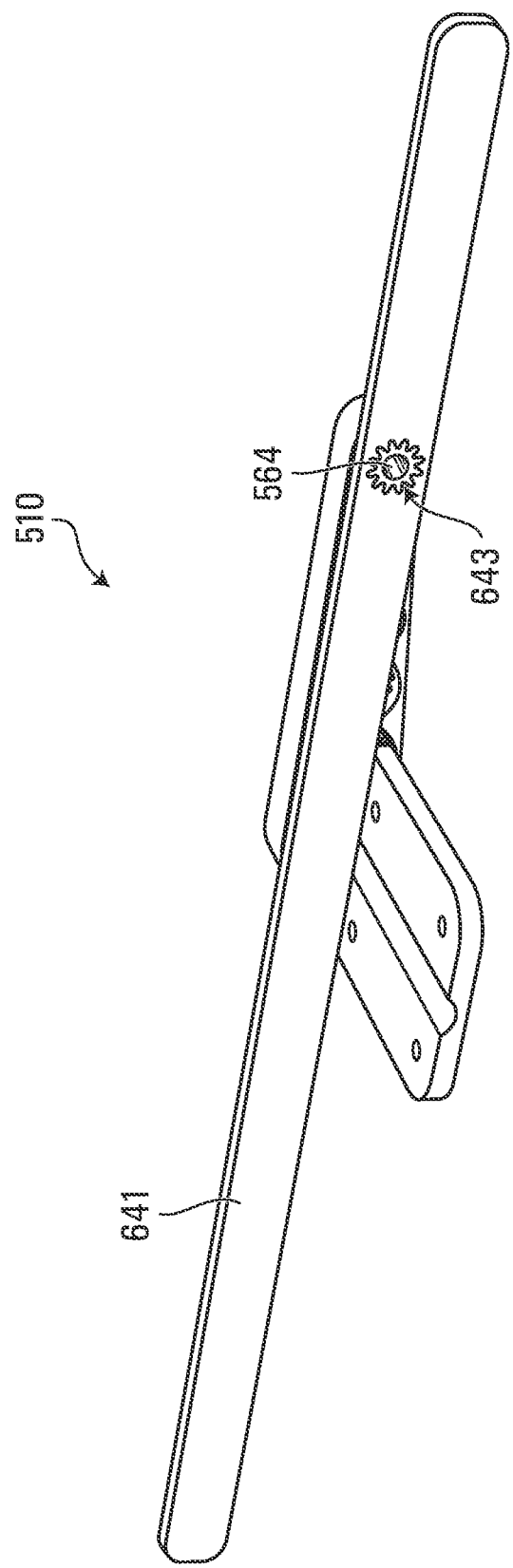
FIG. 20 is a perspective view of the first linkage mechanism of FIG. 19.

FIG. 20 is a perspective view of the first linkage mechanism 510 shown in FIG. 17 and further including top strip 641. The top strip 641 is an elongated strip shaped to fit on the first top member side 532 (shown in FIG. 18). The top strip 641 includes a gear shaped hole 643 that is shaped to fixedly receive the top gear 564, such that the top gear 564 cannot rotate in the gear shaped hole 643. The top strip 641 and the first top member side 532 are adapted so that the top strip 641 is fixedly attachable to the first top member side 532. For example, the top strip 641 may be attached to the first top member side 532 by means of screws, adhesive, welding, latches, or any other suitable means. The top member 502 (shown in FIG. 18) has a threaded hole (not shown) for receiving the top screw 660 (shown in FIG. 19) through the gear shaped hole 643 when the top strip 641 is attached to the top member 502.

The assembly of the device 500 will now be explained with respect to FIGS. 19 to 21. FIG. 21 is a cross-section side view of the device 500 in the opened position, wherein the cross-section is taken along the lines III-III in FIG. 18. The cross-section is taken so that the top gear 564, the base gear 566 and the first, second, third, fourth and fifth intermediate gears 568, 570, 572, 574, 576 are visible.

The top gear 564 is received in the housing recess 617 such that the top gear pin 618 (shown in FIG. 19) is received in the top gear pivot hole 592 (shown in FIG. 19). The first, second, third, fourth and fifth intermediate gears 568, 570, 572, 574, 576 are likewise received in the housing recess 617 on the respective first, second, third, fourth and fifth intermediate gear pins 620, 622, 624, 626, 628 (shown in FIG. 19) such that the first, second, third, fourth and fifth intermediate gears 568, 570, 572, 574, 576 are meshed in series from the top gear 564. The first, second, third, fourth and fifth intermediate gears 568, 570, 572, 574, 576 are held axially in place in the housing recess 617 by the first, second, third fourth and fifth intermediate screws 664, 666, 668, 670, 672 (shown in FIG. 19), which are tightened in the first, second, third, fourth and fifth threaded holes 630, 632, 634, 636 and 638 (shown in FIG. 19). The top gear 564 is also received in the gear shaped hole 643 of the strip 641 (shown in FIG. 20), which is in turn attached to the top member 502 (shown in FIG. 21) by any suitable means. The top screw 660 is received in the top hole 640 (shown in FIG. 19) of the gear housing (both shown in FIG. 19), through the gear shaped hole 643 of the strip 641 (shown in FIG. 20) and into a threaded hole (not shown) in the top member 502 to axially hold the top gear 564 next to the top member 502 and on the top gear pin 618. The gear shaped hole 643 rotationally fixes the top gear 564 to the top member 502.

The base gear 566 is rotatably coupled to the gear housing 512 by means of the base screw 662 and the stepped bush 644 (both shown in FIG. 19). The base gear 566 is meshed to the fifth intermediate gear 576. The pulley attachment member 652 is fixedly attached to the base member 508 (shown in FIG. 21) in the pulley attachment recess 556 (shown in FIG. 18) by any means suitable. For the example, the pulley attachment member 652 may be screwed to the base member 508.

The top gear 564, the base gear 566 and the first, second, third, fourth and fifth intermediate gears 568, 570, 572, 574, 576 are rotatable within the gear housing 512 and are also rotatable with respect to each other. However, the gears 564, 566, 568, 570, 572, 574, 576 do not move translationally with respect to the gear housing. Thus, the top gear 564 forms the first node that is fixedly attached to the first top member side 532 (shown in FIG. 18), the gear housing 512 being rotatably coupled to the top member 502 at the first node. The base gear 566 forms the second node that is fixedly attached to the first base member side 557, the gear housing 512 being rotatably coupled to the base member 508 at the second node. The gear system including the top gear 564, the base gear 566 and the first, second, third, fourth and fifth intermediate gears 568, 570, 572, 574, 576, forms the rotation transfer mechanism connecting to the first node and the second node and is adapted to transfer rotation therebetween, to thereby transfer the rotation of the top member 502 to the counter-rotation of the linkage 512 and vice versa.

The relative sizes of the first, second, third, fourth and fifth intermediate gears 568, 570, 572, 574, 576 with respect to the top gear 564 and the base gear 566 may vary. The sizes shown in FIGS. 18 to 23 are provided by way of example only. For example, the intermediate gears may be larger or smaller than one or both of the top gear 564 and the base gear 566.

The operation of the device 500 will now be described with respect to FIGS. 21 to 24. The movement of the top member 502, the base member 508 and the gear housing 512 with respect to each other as the device is opened or closed is similar to the device 100 described with respect to FIGS. 1 to 16. Specifically, the rotation of the top gear 564 is coupled to the rotation of the base gear 566 such that a rotation of the top member 502 with respect to the base member 508 actuates a counter-rotation of the gear housing 512 with respect to the base member 508. The relative rotation of the top member 502 and the gear housing 512 is defined by the ratio of the diameter of the base gear 566 to the diameter of the first gear 564. Therefore, this ratio may be slightly more than 2:1 in order to provide a top member 502 that rotates approximately 180 degrees when the device 500 is opened or closed.

Figure 21:
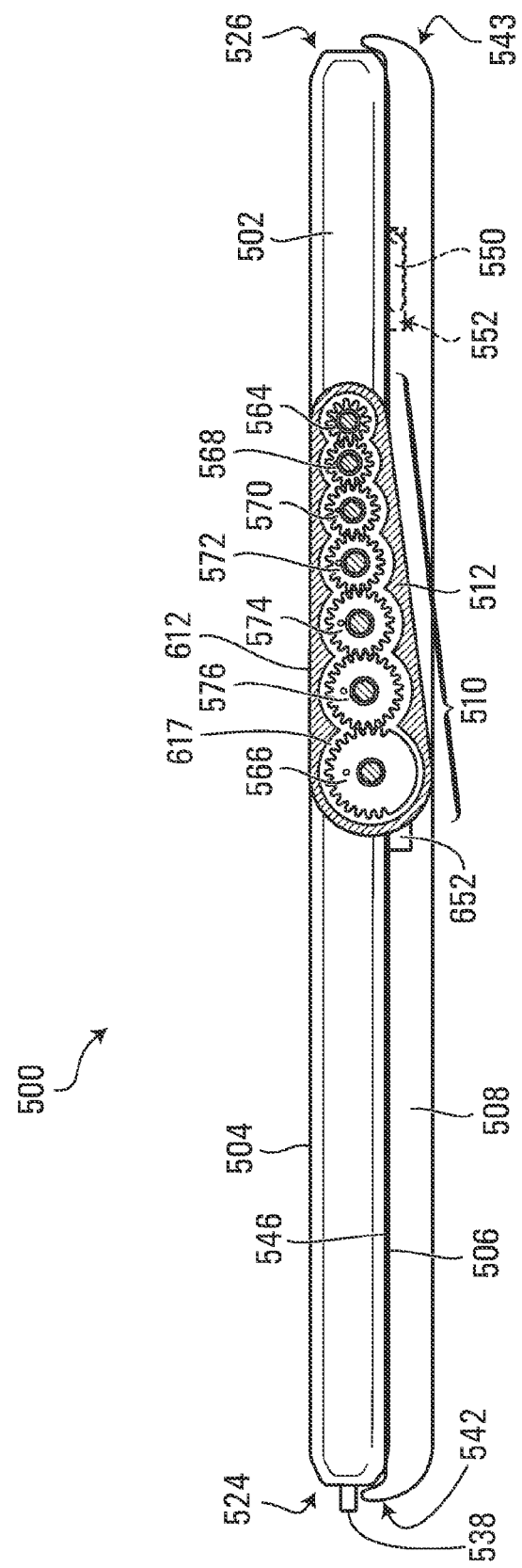
FIG. 21 is a cross-section side view of the device of FIG. 18 in the opened position taken along the lines III-III in FIG. 18.

Turning to FIG. 21, the opened position of the device 500 shown in FIG. 21 is similar to the opened position of the device 100 shown in FIG. 1. As will be described, the movement of the top member 502 with respect to the base member 508 is constrained such that movement to the closed position follows the pre-defined rotational and translational path.

In order to close the device, such that the base member 508 covers the touch screen 536 (shown in FIG. 18), a user may apply a lifting force to the first top member end 524 (e.g. by lifting the flange 538) to initiate movement of the top member 502. Applying a lifting force to the first top member end 524 of the top member 502 causes the top member 502 to rotate clockwise (with respect to the orientation of the device 500 shown in FIG. 21). The rotation of the top gear 564 causes a counter-rotation in the first intermediate gear 568. The counter-rotation of the first intermediate gear causes a rotation of the second intermediate gear 570 and so on until the fifth intermediate gear 576 is rotated in the counter-clockwise direction. From the perspective of the base gear 566 staying still, as shown in the figures, the rotation of the fifth intermediate gear 576 causes it to travel counter-clockwise around the circumference of the base gear 566. Therefore, the gear housing 512 also rotates counter-clockwise about the base gear 566, which is a counter-rotation with respect to the rotation of the top member 502. The device 500, thereby moves towards the position shown in FIG. 22.

The linkage mechanism 510 provides that the top member 502 rotates within the length of the base member 508. Specifically, the top member 502, with exception of the flange 538, does not overhang either the first base member end 542 or the second base member end 543 during any part of the movement between the opened and closed positions.

Figure 22:
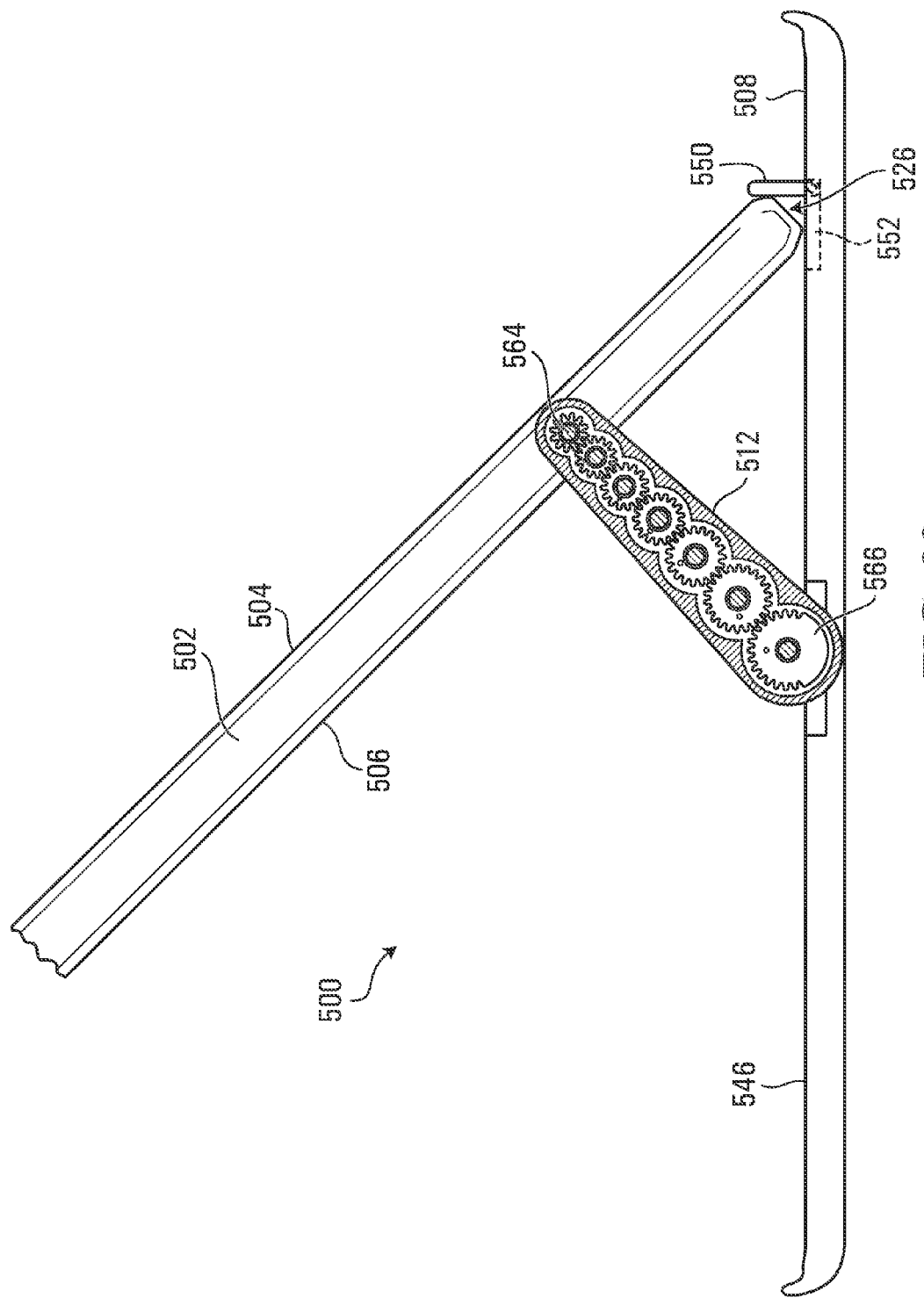
FIG. 22 is a partial cross-section side view of the device of FIG. 18 in a first angled position, wherein the cross section is in the same plane shown in FIG. 21.

FIG. 22 is a partial cross-section side view of the device 500 in a first angled position. FIG. 22 shows the same cross-section plane as FIG. 21, although the device 500 is in a different position. The peg 550 is shown in the upright position in FIG. 22. The peg 550 may act as a hard stop to prevent the top member 502 from moving back to the opened position shown in FIG. 21. Thus, the device 500 is provided with a stable position intermediate the opened and closed positions in which the touch screen 536 (shown in FIG. 18) on the first top member surface 504 is accessible. As described above, a hard or a soft stop may be implemented in various ways, and embodiments are not limited to any particular type of soft or hard stop. In other embodiments, no hard or soft stop is provided. The peg 550 may be left in or returned to the reclined position in order to remove the physical stop holding the top member 502.

Figure 23:
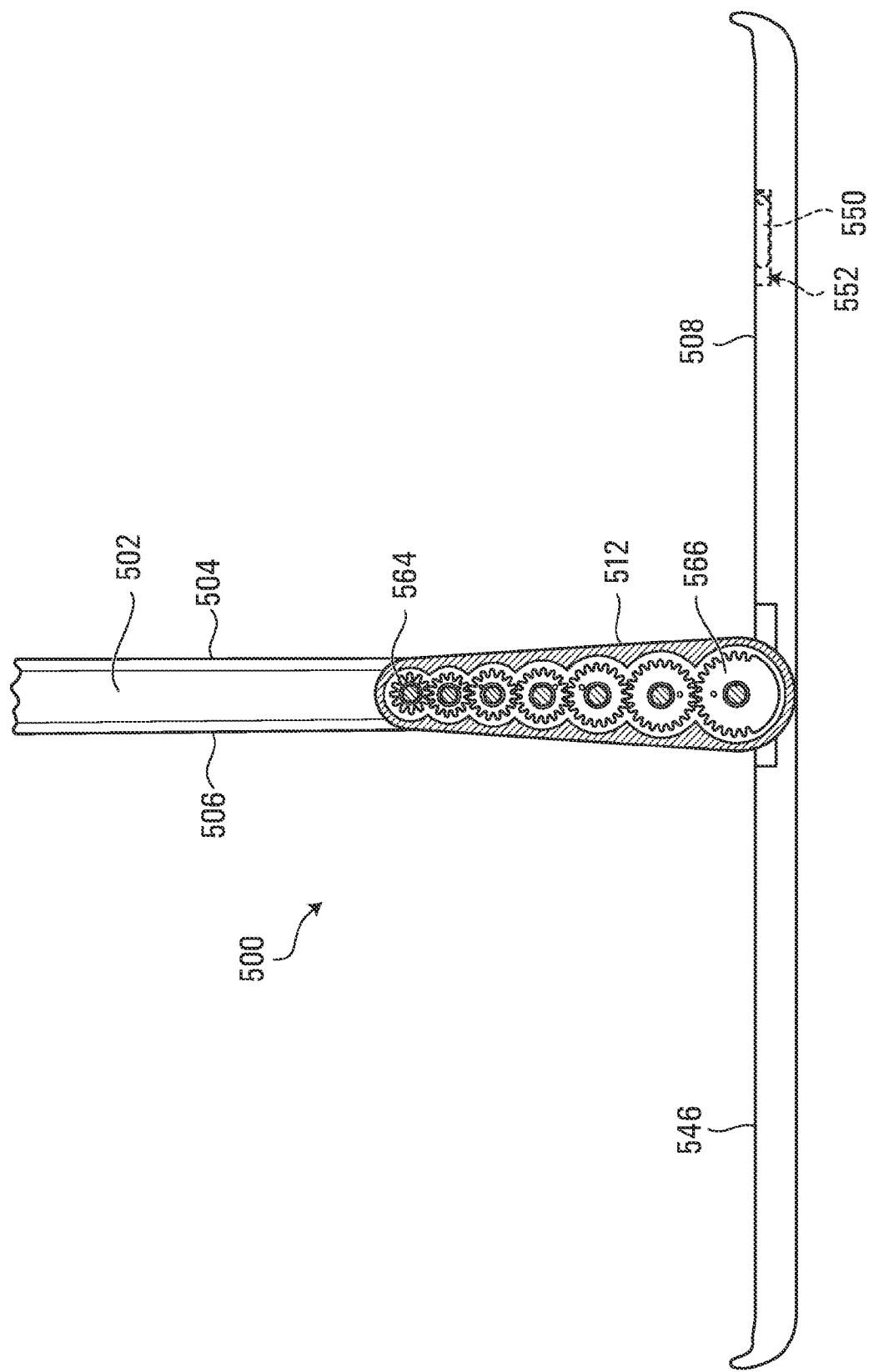
FIG. 23 is a partial cross-section side view of the device of FIG. 18 in an intermediately opened position, wherein the cross section is in the same plane shown in FIG. 21.

FIG. 23 is a partial cross-section side view of the device 500 in an intermediately opened position. FIG. 23 shows the same cross-section plane as FIG. 22, although the device 500 is in a different position. As shown in FIG. 23, when the top member 502 has rotated by approximately 90 degrees, the gear housing 512 has counter-rotated such that it is approximately perpendicular (lengthwise) to the base member 508. Although not shown in FIG. 23, by positioning the top gear 564 less than one quarter of the length of the top member 502 away from the second top member end 526 (shown in FIG. 18), clearance is provided for the top member 502 as the device is moved between the opened and the closed positions. As the device 500 continues to move from the position shown in FIG. 23, it will move to the closed position shown in FIG. 24.

Figure 24:
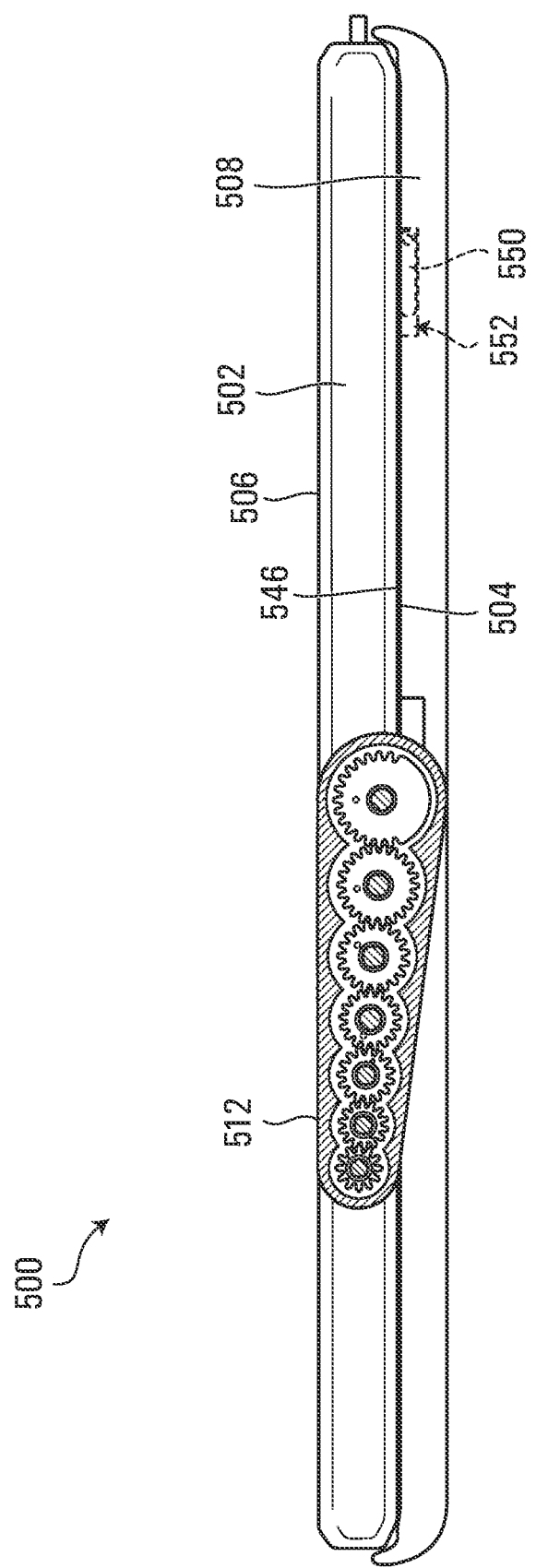
FIG. 24 is a cross-section side view of the device of FIG. 18 in a closed position, wherein the cross section is in the same plane shown in FIG. 21.

FIG. 24 is a cross-section side view of the device 500 in the closed position. FIG. 24 shows the same cross-section plane as FIG. 23, although the device 500 is in a different position. In particular, the top member 502 has been rotated approximately 180 degrees from the opened position shown in FIG. 21. The gear housing 512 has been rotated almost, but less than, 180 degrees, similar to the embodiment shown in FIGS. 1 to 16. As shown in FIG. 24, the top member 502 again overlies the base member 508, but the touchscreen 536 (shown in FIG. 18) is covered and protected by the base member.

In order to move the device from the closed position shown in FIG. 24 back to the opened position shown in FIGS. 18 and 21, the movements described previously simply need to be reversed. The movement from the closed to the opened position will similarly be constrained.

Similar to the device 100 described with reference to FIGS. 1 to 16, the device 500 may be moved between the closed and opened positions by applying force directly or indirectly to the gear housing 512 rather than to the top member 502.

Movement (counter-rotation) of the gear housing 512 would be transferred to rotation of the top member 502. The possible ways of applying force to the linkage described above with respect to the device 100 shown in FIGS. 1 to 16 may also be employed for the device 500 shown in FIGS. 18 to 24.

Other embodiments utilize different numbers and sizes of gears intermediate the top gear 564 and the base gear 566 to transfer rotation therebetween. The number of intermediate gears between the top gear 564 and the base gear 566 determines which direction the intermediate gear meshed with the base gear 566 will travel around the base gear 566. Having an odd number of gears intermediate the top gear 564 and the base gear 566 may provide the proper counter-rotation of the gear housing 512.

Using fewer gears intermediate the top gear 564 and the base gear 566 may reduce the likelihood of gears binding during movement. However, the diameter of gears may be larger if fewer gears are used. Thus, using more gears may reduce a dimensional requirement of the device (e.g. using more gears may allow a slimmer gear housing than an embodiment using fewer gears).

According to some aspects, an assembly including a cover member and at least one linkage mechanism may be provided for use with a mobile electronic device. The assembly may be attachable to, and possibly detachable from, the device. The device may be similar to the top members 102, 402, 502 described above with reference to FIGS. 1 to 24. The cover member may be similar to the base members 108, 408, 508 described above with reference to FIGS. 1 to 24. The at least one linkage mechanism may be similar to the linkage mechanisms 110, 510 described above with reference to FIGS. 1 to 16 and 18 to 24.

Figure 25:
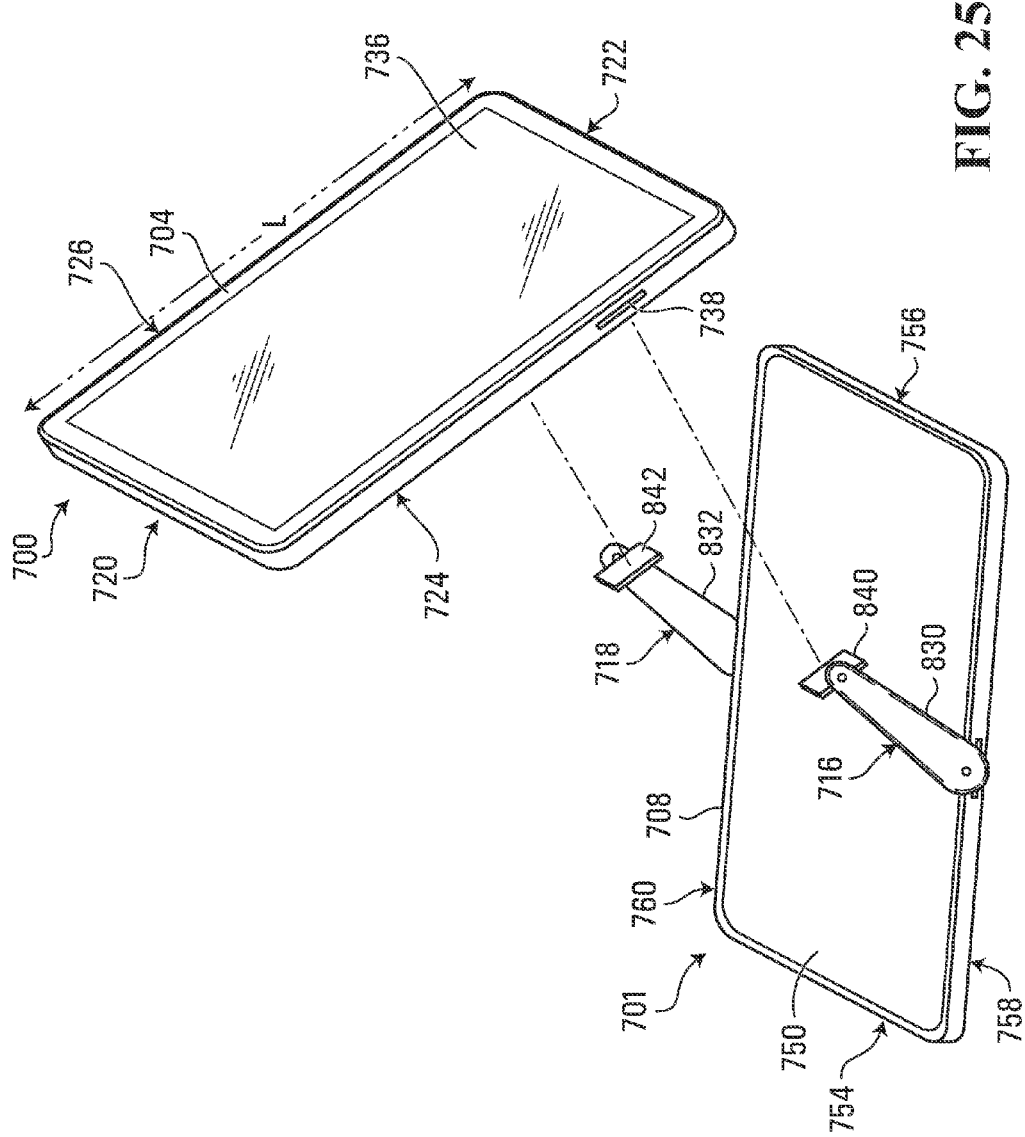
FIG. 25 is an exploded perspective view of a mobile electronic device and an assembly for use with the device according to another embodiment.

FIG. 25 is an exploded perspective view of a mobile electronic device 700 and an assembly 701 for use with the device 700 according to another embodiment. The device 700 has a first device surface 704 and a second device surface (not shown) opposite to the first device surface 704. The assembly 701 is for use with the device 700.

The assembly 701 includes a base or cover member 708. The assembly 701 further includes at least one linkage mechanism 716, 718 interconnecting the device 700 and the cover member 708 such that the device 700 and the cover member 708 can be moved relative to each other between opened and closed positions that are similar to the opened and closed positions described above with respect to the devices 100, 400, 500 shown in FIGS. 1 to 24. In this embodiment, the at least one linkage mechanism includes a first linkage mechanism 716 and a second, mirrored, linkage mechanism 718, although, as described above, embodiments are not limited to those including two linkage mechanisms, or mirrored linkage mechanisms.

The device 700 is similar to the top members 102, 402 and 502 described above with reference to FIGS. 1 to 24. The device 700 is generally rectangular shaped having a first device end 720, an opposite second device end 722, a first device side 724 and a second opposite device side 726. As with the other embodiments described herein, the size and shape of the device 700 are provided as examples only, and the size and shape of the device may vary in other embodiments.

The device 700, in this embodiment, also includes a touchscreen 736 on the first device surface 704. However, one or more other interface elements may be present on one or more surfaces of the device 700. In other embodiments, no touchscreen may be present. Embodiments are not limited to any particular arrangement of interface elements on the device.

As will be discussed below, in this embodiment, the assembly 701 (including the cover member 708 and the at least one linkage mechanism 716, 718) is attachable to the device 700, and may also be detachable from the device 700.

In the embodiment shown in FIG. 25, the device 700 is provided with a first device slot 738 and a second device slot (not shown). The device 700 has a length L shown in FIG. 25. The first device slot 738 is located on the first device side 724 less than one quarter of the length L from the second device end 722. The first device slot 738 is also located centrally between the first device surface 704 and the second device surface (not shown). The second device slot mirrors the first device slot 738 on the second device side 726. As will be discussed below, the first device slot 738 and the second device slot are provided, in this embodiment, for the purpose of allowing the first linkage mechanism 716 and the second linkage mechanism 718 to be attached to and detached from the device 700. The position, shape and other structural details of the first device slot 738 and the second device slot may vary in different embodiments, as will also be discussed below. The first device slot 738 and the second device slot are optional and may be omitted in other embodiments.

The cover member 708 is similar to the base members 108, 408 and 508 described above with reference to FIGS. 1 to 24. The cover member 708 is generally rectangular and has an upper cover member surface 750 and a lower cover member surface (not shown) opposite to the upper cover member surface 750. The cover member 708 also has a first cover member end 754, an opposite second cover member end 756, a first cover member side 758 and an opposite second cover member side 760.

The first and second linkage mechanisms 716, 718 coupling the device 700 and the cover member 708 are similar to the linkage mechanisms 110 and 510 described above with reference to FIGS. 1 to 24. Specifically, in this embodiment, the first and second linkage mechanisms 716, 718 each include a linkage (not shown) intermediate the device 700 and the cover member 708, the linkage having a fixed length, and a motion constraint mechanism (not shown). However, in this embodiment, elements of the first and second linkage mechanisms 716, 718 (including the linkage and the motion constraint mechanism) are hidden by a first linkage housing 830 and a second linkage housing 832 respectively. The linkage and the motion constraint mechanism may be similar to the linkages 112, 412, 512 and the motion constraint mechanisms 114, 514 described above with reference to FIGS. 1 to 24.

In this embodiment, the first and second linkage mechanisms 716, 718 are attachable to and detachable from the device 700. In other embodiments, the at least one linkage mechanism may be attached to the cover member in a nondetachable manner. The device 700 could be used in isolation from the assembly 701. For example, the at least one linkage mechanism 716, 718 may be adapted to "snap on" and "snap off" the device. One skilled in the art will appreciate that various means may be used to allow the at least one linkage mechanism to be attached to and detached from the device. For example, a latch, or conventional snap may be used. In the embodiment shown in FIG. 25, the first and second linkage mechanisms 716 and 718 include a first linkage tab 840 and a second linkage tab 842, respectively. Each of the first linkage tab 840 and the second linkage tab 842 are generally rectangular tabs. The first linkage tab 840 and the second linkage tab 842 are shaped to be received in the first device slot 738 and the second device slot (not shown), respectively. The first linkage mechanism 716 and the second linkage mechanism 718 may bend outward slightly in order to allow the first linkage tab 840 and the second linkage tab 842 to fit around the first device side 724 and the second device side 726 respectively to place the first linkage tab 840 and the second linkage tab 842 into the first device slot 738 and the second device slot.

As described herein, the motion constraint mechanism, in some embodiments, may include a first node fixedly attached to a side of the device, the linkage being rotatably coupled to the device at the first node; a second node fixedly attached to a side of the cover member, the linkage being rotatably coupled to the cover member at the second node; and a rotation transfer mechanism adapted to rotationally couple the first node and the second node to thereby transfer the rotation of the device 700 to the counter-rotation of the linkage and vice versa. In the case of the device 700 and assembly 701 shown in FIG. 25, the first linkage tab 840 and the second linkage tab 842 may rotatably fix the first node (for each linkage mechanism 716, 718) to the device 700 because the first linkage tab 840 and the second linkage tab 842 cannot rotate in the first device slot 738 and the second device slot (not shown) respectively. However, other methods of rotatably fixing the first node to the device may be used in other embodiments.

The material forming the elements of the first and second linkage mechanisms 716, 718, such as the first linkage housing 830 and the second linkage housing 832 may have sufficient stiffness and/or resilience to provide a biasing force that resists the first and second linkage mechanisms 716, 718 from bending. This biasing force may be sufficient to axially fix the first linkage mechanism 716 and the second linkage mechanism 718 to the device 700 absent force applied by the user. However, other methods of holding the tabs to the device may be used in other embodiments.

The specific structure of the linkage tabs may vary. For example, the linkage tabs may include locking means to lock the tabs in the device, such as expandable locking members that expand into corresponding recesses in a slot in the device. In other embodiments, the tabs may be shaped differently (e.g. semi-circular, not flat, etc) than the first linkage tab 840 and the second linkage tab 842 shown in FIG. 25. In some embodiments, the tabs and corresponding slots in the device may also function as electrical connections to allow signals and/or power to be communicated between the device and the cover member.

In some embodiments, the linkage mechanisms may not be detachable from the device once attached. For example, tabs including barbed latches that hold the linkage mechanisms to the device may be used.

In some embodiments, the linkage mechanisms may be attachable to and detachable from the cover member in addition to, or rather than, the device. For example, the linkage mechanisms in some embodiments may include tabs similar to the first linkage tab 840 and the second linkage tab 842 described above and may be received in slots in the cover member. Any other suitable type of attachable/detachable connections may also be used.

When the assembly 701 is attached to the device 700, the operation of the device 700 and the assembly 701 is similar to the devices 100, 400, 500 described above with reference to FIGS. 1 to 24, with the exception that the cover member 708 and the first and second linkage mechanisms 716, 718 form the attachable and detachable assembly 701. The assembly 701 may be provided to a user separately (as an accessory) for use with the device 700, or the assembly 701 may be sold together with the device 700 in a kit. The device 700 may be used independently of the assembly 701. However, when the assembly 701 is attached, the movement of the device 700 between opened and closed positions will be similar to the top members 102, 402, 502 described with reference to FIGS. 1 to 24.

Providing the assembly 701 (including the cover member 708 and the first and second linkage mechanisms 716 and 718) separately from the device 700, a user may use the device 700 with no cover when desired. For example, the device 700 without the assembly 701 may require less space (e.g. for packing when space is limited). Cover members could possibly be swapped out with covers having a variety of designs. Thus, providing the assembly as an attachable/detachable accessory may provide more options to a user for configuring the device according to current needs.

The possible variations and alterations of the embodiments described above with reference to FIGS. 1 to 24 may also be applied to the embodiment shown in FIG. 25.

One skilled in the art will appreciate that the device described herein (including the specific example embodiments described with reference to FIGS. 1 to 25) may further include components of typical mobile electronic devices. For example, electrical connections between the top member and the base member. For example, in some embodiments, the base member includes interface, display, or power supply elements that are connected electrically to elements of the top member. Such connections may be made via wires that travel internal to the linkage mechanism coupling the top and base members. A power supply such as a battery or connections to an external power supply may be present in one or both of the top member and the base member of the device.

Some embodiments may be smaller devices than the devices 100, 400, 500 and 700 shown in FIGS. 1 to 25. The linkage mechanisms described herein may be applied to more conventionally sized mobile communication devices such as mobile phones, portable gaming devices etc. Some embodiments include a push-button for initiating movement between the closed and opened positions, thereby possibly providing a fully single handed method of initiating the movement.

The linkage mechanism described herein with reference to the figures may include further features such as protective trims, guards, locking mechanisms and other elements without substantially altering the linkage mechanism function described herein. For example, in some embodiments, an additional cover is provided around the linkage mechanism that partially or substantially blocks some or all of the elements of the linkage mechanism from view and/or from being accessed by a user of the device. As another example, in some embodiments, one or more biasing mechanisms, such as springs or magnets, may be provided to provide a biasing force to assist with the movement of the device between the closed and opened positions. One skilled in the art will recognize that other modifications may be made while maintaining the functionality of the described linkage mechanism.

One skilled in the art will appreciate that the embodiments described herein and shown in FIGS. 1 to 25 may include electronic components not shown as well as means for powering the components and communicating between the components and the interface elements described herein. In some embodiments, power and/or electronic signal communication may be provided between the top and base members. For example, wireless or wired communication may be provided. Wires for transmitting power or electrical signals are provided in the linkage mechanism in some embodiments. Wireless methods such as Bluetooth™ may be used to communicate signals between processing elements in each of the top and base members. Various other configurations are also possible while remaining consistent with aspects of the disclosure.

One skilled in the art will also appreciate that constraining movement of the top member to a pre-defined path does not necessarily mean that the relative positions of the top member, the base member and the linkage mechanism are absolutely defined for the entire movement between the opened and closed positions. The pre-defined path, in some embodiments, may have some degree of tolerance. For example, at points in the pre-defined path there might be some possible movement due to "play" in the device. Such play could be caused, for example, by slack in a pulley, backlash in one or more gears and/or other interactions of parts in the device. For example, the top member 502 of the device 500 shown in FIG. 18 may be able to rotate a small amount (for example, 1 to 5 degrees) without any rotation being transferred to the gear housing 512. In some embodiments, components that minimize such tolerances and "play" in the device may be used. For example, a gear system may include gears specially designed to reduce backlash. A pulley system (for example the device 100 described with respect to FIGS. 1 to 16) may maintain sufficient tension in the line coupling the pulleys that backlash and/or "play" is reduced or even substantially eliminated.

Some embodiments may include a mechanism, such as a clutch mechanism, to prevent damage to the device in the event that the linkage mechanism is overloaded by a force applied to the device. For example, damage may result if a user of the device applies too much force to rotate the top member while also applying force to hold the linkage in place, thereby attempting to force the top member to move out of the pre-defined path set by the motion constraint mechanism. However, a clutch mechanism may prevent such damage by allowing a component, such as the first or second node, to "slip" and allow motion outside of the pre-defined path if a pre-determined amount of force is applied. For example, a pulley fixed to the top or base member could include a mechanism to allow the pulley to rotate with respect to the top or base member in the presence of sufficient force. One skilled in the art will appreciate that a clutch mechanism could be implemented in various ways. By allowing a component of the device to "slip" as described above, the top member and the base member may be moved out of alignment compared to the proper pre-defined movement. However, a user may, in some embodiments, simply push the top member against the base member in either the closed or opened position to again overload the clutch mechanism and re-align the top and base members.

What has been described is merely illustrative of the application of the principles of the disclosure. Other arrangements and methods can be implemented by those skilled in the art without departing from the spirit and scope of the disclosure.

The invention claimed is:

1. A mobile electronic device comprising:
    a first member having a first surface and a second surface opposite to the first surface;
    a second member; and
    at least one linkage mechanism coupling the first member and the second member such that the device may be moved between a first position and a second position, the at least one linkage mechanism comprising:
        a linkage intermediate the first member and the second member; and
        a motion constraint mechanism that constrains movement of the first member with respect to the second member between the first and second positions to a pre-defined rotational and translational path, the rotational and translational path being defined by rotation of the first member with respect to the second member and counter-rotation of the linkage with respect to the second member, wherein when the device is in the first position, the first member overlies the second member, the first surface is accessible and faces away from the second member, and the second surface faces toward the second member, and when the device is in the second position, the first member overlies the second member, the second surface is accessible and faces away from the second member, and the first surface faces toward the second member.

2. The device of claim 1, wherein the motion control mechanism is a pulley system intermediate the first member and the second member.

3. The device of claim 1, wherein the motion constraint mechanism transfers said rotation of the first member to said counter-rotation of the linkage and transfers said counter-rotation of the linkage to said rotation of the first member, thereby coupling said rotation of the first member with said counter-rotation of the linkage.

4. The device of claim 3, wherein the motion constraint mechanism comprises:
    a first node fixedly attached to a side of the first member, the linkage being rotatably coupled to the first member at the first node;
    a second node fixedly attached to a side of the second member, the linkage being rotatably coupled to the second member at the second node, the linkage having a fixed length; and
    a rotation transfer mechanism that rotationally couples the first node and the second node to thereby transfer said rotation of the first member to said counter-rotation of the linkage and transfer said counter-rotation of the linkage to said rotation of the first member.

5. The device of claim 4, wherein the first member has a first end and a second end, and the first member has a length (L) between the first end and the second end, and the first node is located less than one quarter of the length (L) away from the second end of the first member, the first end of the first member initially rotating away from the second member during the movement between the first position and the second position.

6. The device of claim 4, wherein the second member has a first end and a second end, and the second node is located centrally between the first end and the second end of the second member.

7. The device of claim 4, wherein:
    the first member has a first axis of rotation, and the first node has a first perimeter about the first axis of rotation;
    the linkage has a second axis of rotation, and the second node has a second perimeter about the second axis of rotation; and
    the rotation transfer mechanism comprises a flexible link that is wrapped around at least a portion of each of the first and second perimeters, and which is anchored to each of the first node and the second node.

8. The device of claim 4, wherein the motion constraint mechanism comprises a pulley system, the first node comprising a first pulley of the pulley system, the second node comprising a second pulley of the pulley system, and the rotation transfer mechanism comprising at least one line of the pulley system, the at least one line coupling the first pulley and the second pulley.

9. The device of claim 8, wherein a diameter of the second pulley and a diameter of the first pulley are in accordance with the formula:

$$D2 = \left(\frac{(2*\alpha) + 180}{2*\alpha}\right) D1,$$

where D1 is the diameter of the first pulley;
D2 is the diameter of the second pulley;
(2*α) is the total rotation of the linkage in movement between the first and second positions; and
the first member rotates approximately 180 degrees between the first and second positions.

10. The device of claim 8, wherein the at least one line is anchored to each of the first pulley and the second pulley to form two line sections of equal length, each of the line sections being anchored to the first pulley and the second pulley.

11. The device of claim 10, wherein,
when the device is in the first position, the first line section is wrapped substantially around the first pulley and substantially unwrapped from the second pulley, and the second line section is substantially unwrapped from in the first pulley and wrapped partially around the second pulley, and
when the device is in the second position, the second line section is wrapped substantially around the first pulley and substantially unwrapped from the second pulley, and the first line section is substantially unwrapped from in the first pulley and wrapped partially around the second pulley.

12. The device of claim 8, wherein the first pulley and the second pulley do not protrude above the first member or below the second member in both the first position and the second position.

13. The device of claim 8, wherein the first pulley comprises a hole through which the at least one line passes, the at least one line being anchored to the first pulley within the hole, and the hole is offset from the centre of a circular cross-section of the first pulley.

14. The device of claim 4, wherein the motion constraint mechanism comprises a gear system, the first node comprising a first gear of the gear system, the second node comprising a second gear of the gear system, and the rotation transfer mechanism comprising at least one further gear meshed intermediate the first gear and the second gear.

15. The device of claim 14, wherein the at least one further gear meshed intermediate the first gear and the second gear comprises an odd number of gears.

16. The device of claim 1, wherein movement of the first member with respect to the second member between the first position and the second position comprises a rotation of the first member of about 180 degrees.

17. The device of claim 1, wherein the first member further comprises at least one interface element on the first surface.

18. The device of claim 1, wherein the second member comprises a protective cover.

19. A mobile electronic device comprising:
a first member having a first surface and a second surface opposite to the first surface;
a second member; and
at least one linkage mechanism coupling the first member and the second member such that the device may be moved between a first position and a second position, the at least one linkage mechanism comprising:
a linkage intermediate the first member and the second member; and
a motion constraint mechanism that constrains movement of the first member with respect to the second member between the first and second positions to a pre-defined rotational and translational path, the rotational and translational path being defined by a rotation of the first member with respect to the second member and a counter-rotation of the linkage with respect to the second member, wherein
the pre-defined path comprises about 180 degrees of rotation of the first member with respect to the second member with the first member being in approximately a same lateral position in both the first position and the second position.

20. An assembly for use with a mobile electronic device, the assembly comprising:
a cover member; and
at least one linkage mechanism that is attachable to the device,
the at least one linkage mechanism, when attached to the device, interconnecting the device and the cover member such that the device and the cover member can be moved relative to each other between:
a first position wherein the device overlies the cover member;
a second position wherein the device overlies the cover member and the device is rotated about 180 degrees with respect to the first position,
the at least one linkage mechanism comprising:
a linkage intermediate the device and the cover member; and
a motion constraint mechanism that constrains movement of the device with respect to the cover member between the first and second positions to a pre-defined rotational and translational path, the rotational and translational path being defined by a rotation of the device with respect to the cover member and a counter-rotation of the linkage with respect to the cover member.

21. The assembly of claim 20, wherein the motion control mechanism is a pulley system intermediate the cover member and the device.

22. The assembly of claim 20, wherein the motion constraint mechanism transfers said rotation of the cover member to said counter-rotation of the linkage and transfers said counter-rotation of the linkage to said rotation of the device, thereby coupling said rotation of the cover member with said counter-rotation of the linkage.

23. The assembly of claim 22, wherein the motion constraint mechanism comprises:
a first node fixedly attached to a side of the cover member, the linkage being rotatably coupled to the cover member at the first node;
a second node fixedly attached to a side of the device, the linkage being rotatably coupled to the device at the second node, the linkage having a fixed length; and
a rotation transfer mechanism that rotationally couples the first node and the second node to thereby transfer said rotation of the cover member to said counter-rotation of the linkage and transfer said counter-rotation of the linkage to said rotation of the cover member.

24. The assembly of claim 23, wherein the motion constraint mechanism comprises a pulley system, the first node comprising a first pulley of the pulley system, the second node comprising a second pulley of the pulley system, and the rotation transfer mechanism comprising at least one line of the pulley system, the at least one line coupling the first pulley and the second pulley.

25. The assembly of claim 24, wherein a diameter of the second pulley and a diameter of the first pulley are in accordance with the formula:

$$D2 = \left(\frac{(2*\alpha) + 180}{2*\alpha}\right) D1,$$

where D1 is the diameter of the first pulley;
D2 is the diameter of the second pulley;
(2*α) is the total rotation of the linkage in movement between the first and second positions; and
the cover member rotates approximately 180 degrees between the first and second positions.

* * * * *